United States Patent
Kamakura et al.

(10) Patent No.: US 6,172,657 B1
(45) Date of Patent: Jan. 9, 2001

(54) BODY MOUNT-TYPE INFORMATION DISPLAY APPARATUS AND DISPLAY METHOD USING THE SAME

(75) Inventors: Hiroshi Kamakura; Hiroshi Ono, both of Suwa (JP)

(73) Assignee: Seiko Epson Corporation, Tokyo (JP)

( * ) Notice: Under 35 U.S.C. 154(b), the term of this patent shall be extended for 0 days.

(21) Appl. No.: 08/945,272

(22) PCT Filed: Feb. 26, 1997

(86) PCT No.: PCT/JP97/00576

§ 371 Date: Oct. 27, 1997

§ 102(e) Date: Oct. 27, 1997

(87) PCT Pub. No.: WO97/31477

PCT Pub. Date: Aug. 28, 1997

(30) Foreign Application Priority Data

Feb. 26, 1996 (JP) .................................... 8-38457

(51) Int. Cl.⁷ .................................................. G09G 5/00
(52) U.S. Cl. ........................ 345/8; 345/7; 345/4; 345/5
(58) Field of Search .................... 345/8, 7, 4, 5, 345/157, 146; 348/42; 358/108, 113

(56) References Cited

U.S. PATENT DOCUMENTS

| 4,690,657 | * | 9/1987 | Lodrick, Sr. ............... 446/134 |
| 5,005,213 | * | 4/1991 | Hanson et al. ............. 359/146 |

(List continued on next page.)

FOREIGN PATENT DOCUMENTS

| 0 531 645 A2 | 3/1993 | (EP) . |
| 0 539 907 A2 | 5/1993 | (EP) . |
| 0 679 984 A1 | 11/1995 | (EP) . |
| 0 716 329 | 6/1996 | (EP) . |
| 6-19526 | 1/1994 | (JP) . |
| 7-98716 | 4/1995 | (JP) . |
| 7-249006 | 9/1995 | (JP) . |
| 7-311857 | 11/1995 | (JP) . |
| WO 88/02494 | 4/1988 | (WO) . |
| WO92/06392 | 4/1992 | (WO) . |
| WO95/07526 | 3/1995 | (WO) . |
| WO95/11473 | 4/1995 | (WO) . |
| WO 96/00406 | 1/1996 | (WO) . |

OTHER PUBLICATIONS

Catalog, 6 pages, "Trekker".
Kenneth Meyer, et al. Presence, vol. 1, No. 2, pp. 173–200 "A Survey of Position Trackers", 1992.
Patent Abstracts of Japan, vol. 17, No. 707 (P–1667) Dec. 24, 1993, JP 5–241540, Sep. 21, 1993.

* cited by examiner

Primary Examiner—William A. Cuchlinski, Jr.
Assistant Examiner—Marthe Y Marc-Coleman
(74) Attorney, Agent, or Firm—Oblon, Spivak, McClelland, Maier & Neustadt, P.C.

(57) ABSTRACT

In a body mount-type information display apparatus, a display unit (103) is attached to the head of a user, whereas a control circuit unit (105) is attached to the waist or the shoulder. The display unit enables a light beam from the outside to enter the eyes of the user as well as another light beam representing an image produced by the control circuit unit. The user can accordingly observe the image including required pieces of information for the work together with the outside view. This image may be menu-type information or an image in harmony with an object such as a building. In order to display the image in harmony with the object, the direction, the visual angle, and the size of the image are processed according to the positional relationship between the user and the object. Available input means include magnetic and optical pointing devices and a CCD camera for reading a bar code. The control circuit unit that is not attached to the body may be connected with peripheral equipment and used as a desktop computer.

30 Claims, 20 Drawing Sheets

FIRST EMBODIMENT

U.S. PATENT DOCUMENTS

| | | | |
|---|---|---|---|
| 5,045,843 | * | 9/1991 | Hansen .................................. 345/158 |
| 5,250,929 | * | 10/1993 | Hoffman et al. ...................... 345/146 |
| 5,392,158 | * | 2/1995 | Tosaki .................................. 359/633 |
| 5,550,585 | * | 8/1996 | Cherri .................................. 348/207 |
| 5,579,026 | * | 11/1996 | Tabata ..................................... 345/8 |
| 5,610,678 | * | 3/1997 | Tsuboi et al. ........................ 396/373 |
| 5,710,574 | * | 1/1998 | Jaaskelainen, Jr. .................. 345/145 |
| 5,712,649 | * | 1/1998 | Tosaki ....................................... 345/8 |
| 5,739,797 | * | 4/1998 | Karasawa et al. ........................ 345/8 |
| 5,742,263 | * | 4/1998 | Wang et al. .............................. 345/8 |
| 5,742,264 | * | 4/1998 | Inagaki et al. ........................... 345/8 |
| 5,815,126 | * | 9/1998 | Fan et al. ................................. 345/8 |
| 5,835,279 | * | 11/1998 | Marshall et al. ...................... 359/645 |
| 5,917,460 | * | 6/1999 | Kodama .................................... 345/8 |
| 5,926,178 | * | 7/1999 | Kurtenbach ........................... 345/352 |

FIRST EMBODIMENT

Fig. 6
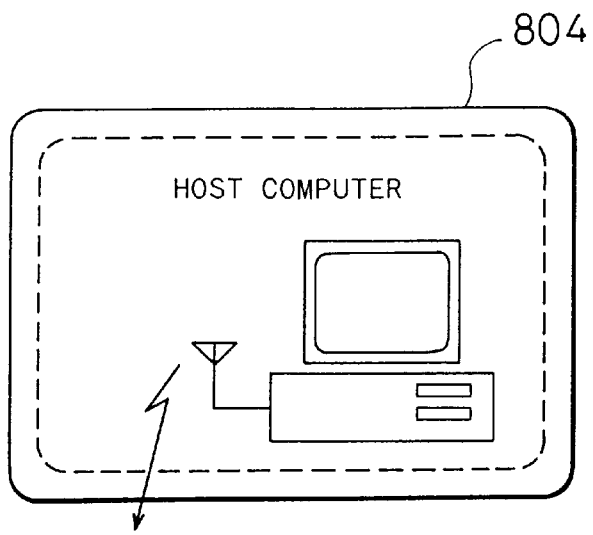
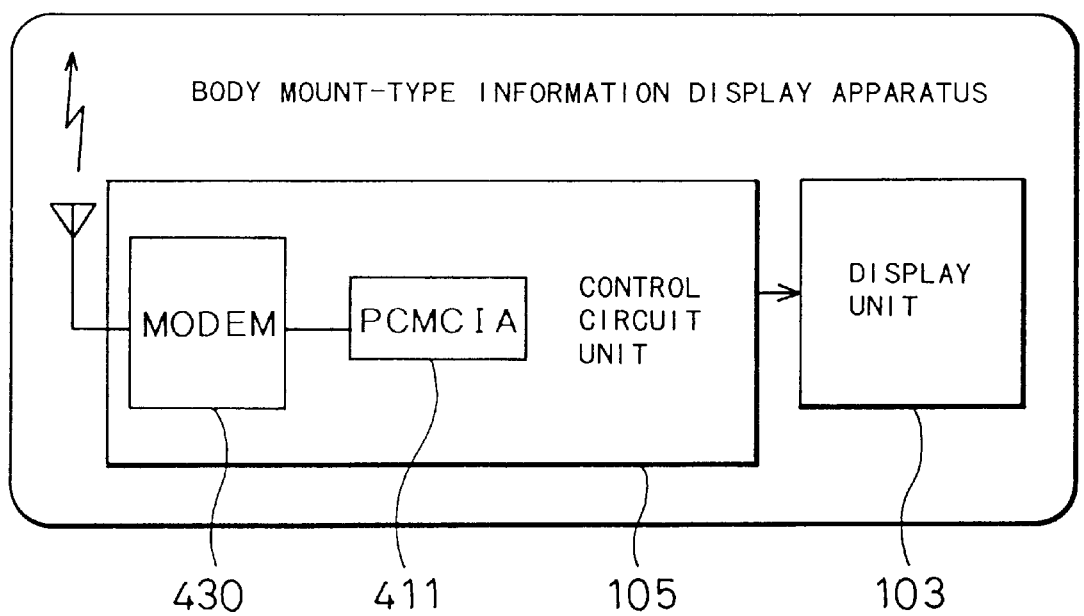

WATER PIPE DETECTION

SECOND EMBODIMENT

THIRD EMBODIMENT

Fig. 15(a) MODULATOR UNIT IN CONTROL CIRCUIT UNIT
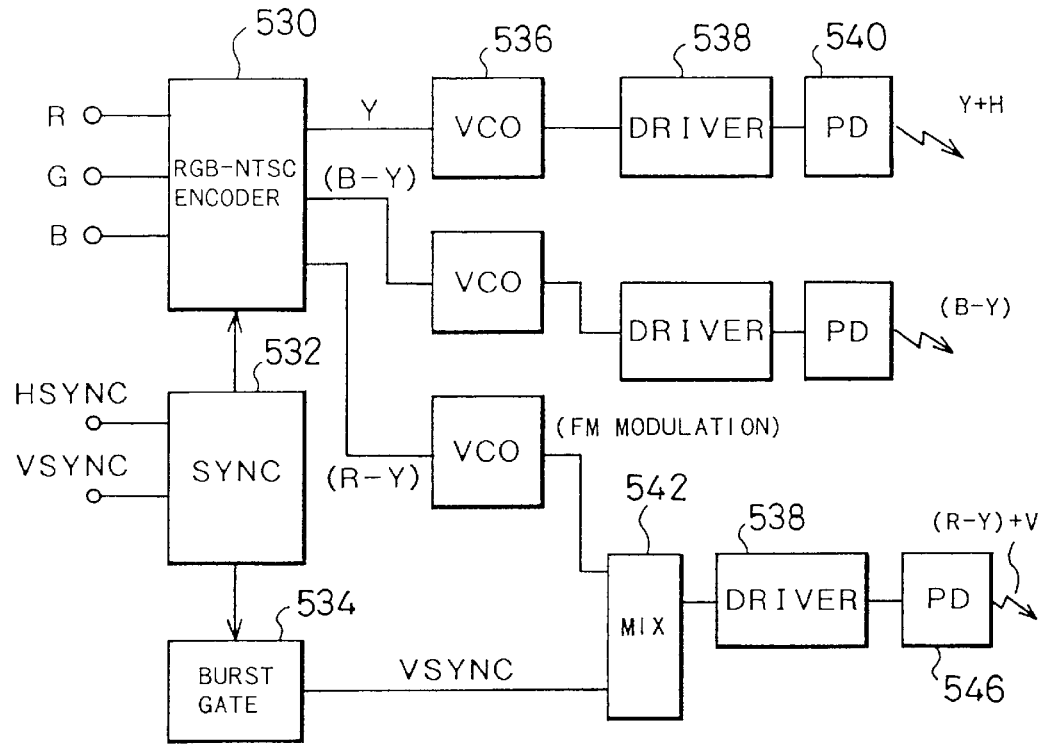
Fig. 15(b) DEMODULATOR UNIT IN INTERFACE UNIT
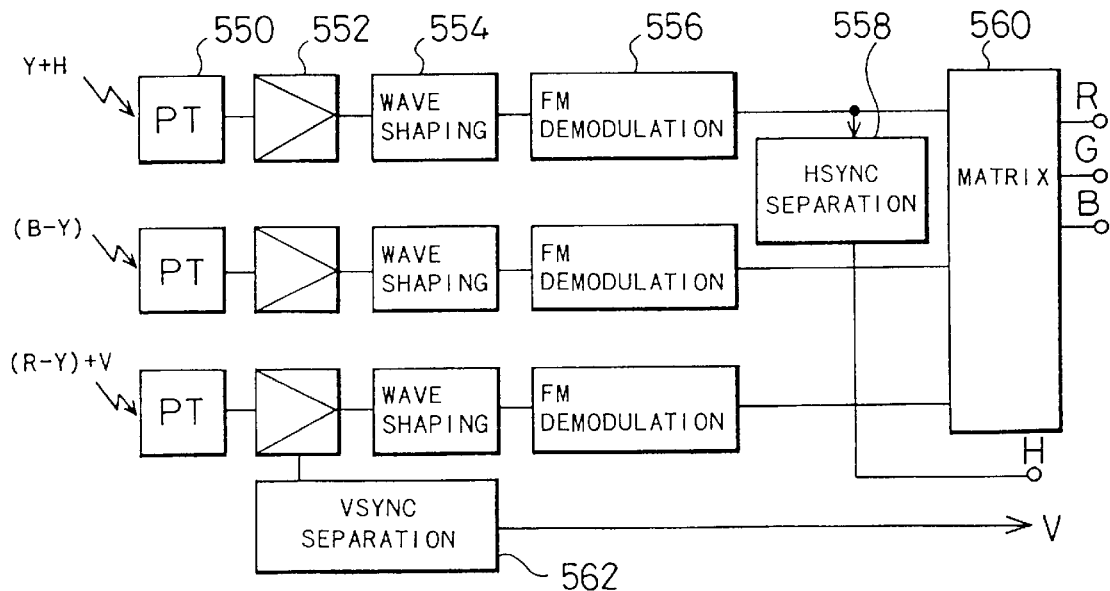

Fig. 16(a)
MAGNETIC FIELD-BASED INPUT
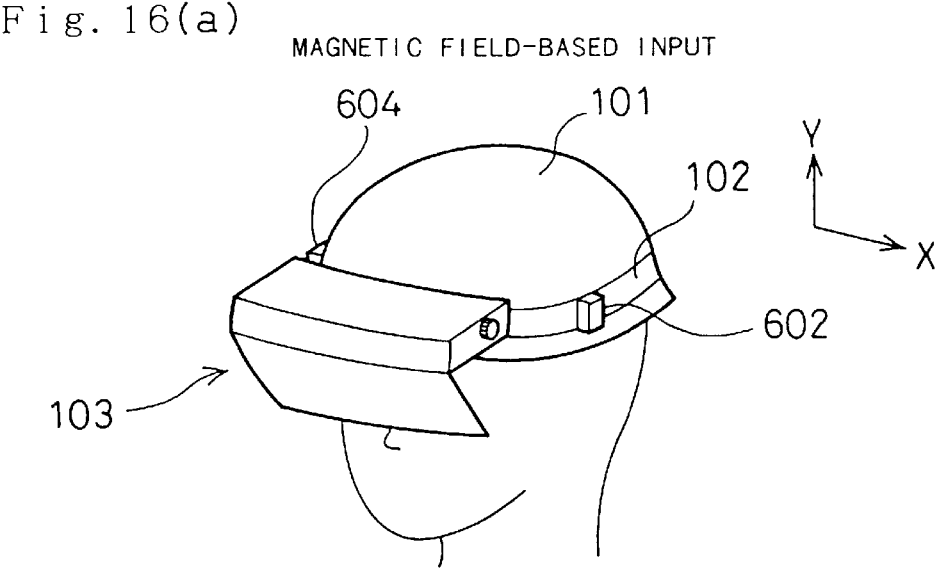
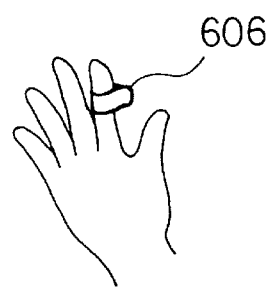
Fig. 16(b)
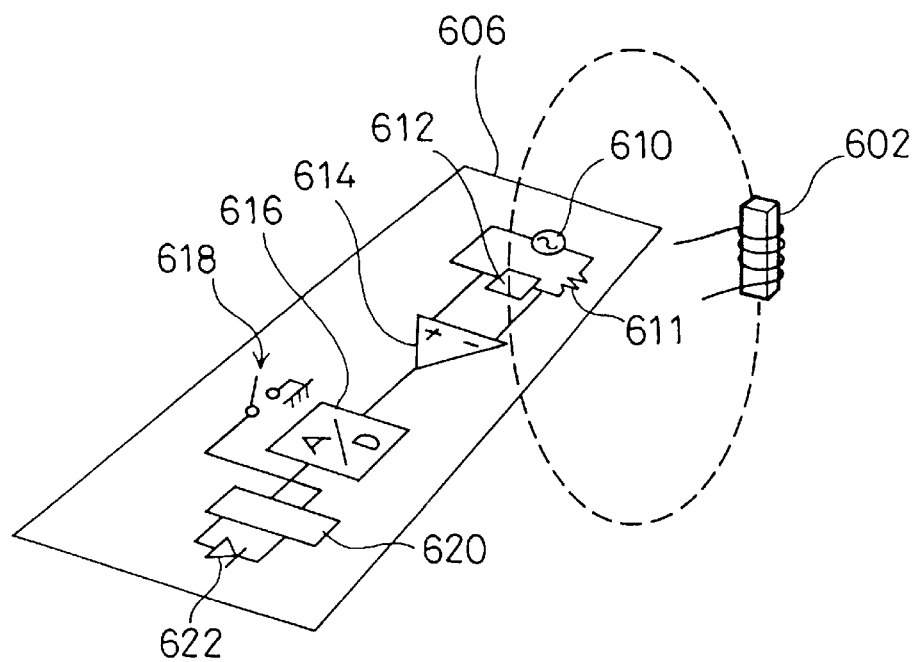

Fig. 17(a)   INFRARED EMISSION-BASED INPUT
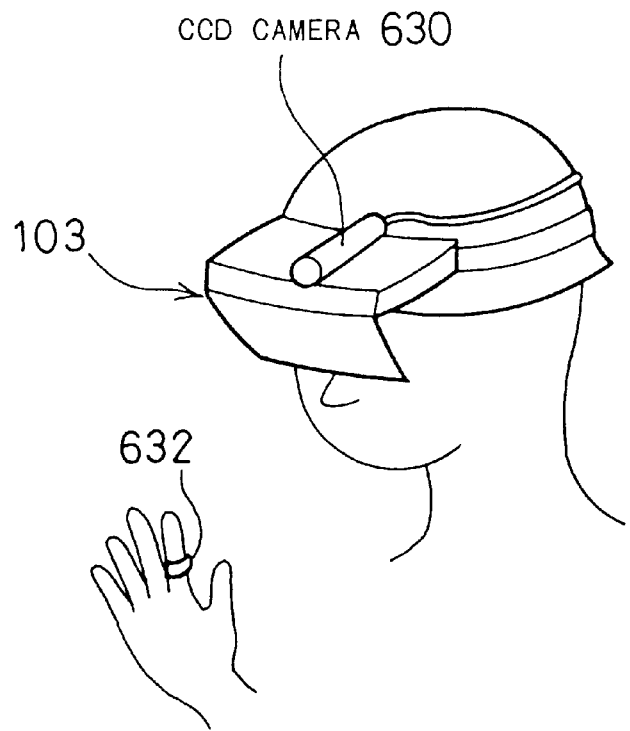
Fig. 17(b)
DISPLAYED IMAGE FOR INPUT
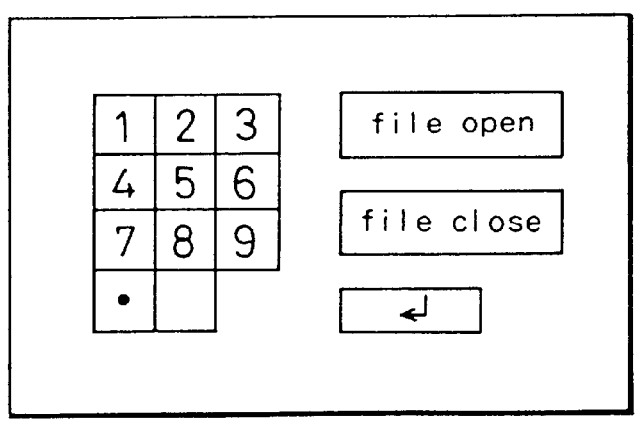

TABLE OF MANUFACTURING PROCESS

TWO-DIMENSIONAL BAR CODE

ON/OFF CONTROL OF DISPLAY THROUGH EYE INPUT

BODY MOUNT-TYPE INFORMATION DISPLAY APPARATUS AND DISPLAY METHOD USING THE SAME

TECHNICAL FIELD

The present invention relates to a body mount-type information display apparatus which is attachable to the body of a user and a display method using the same.

BACKGROUND ART

Advanced computer technology enables electronic information to be readily processed by a portable information processing apparatus, such as a mobile computer. The portable information processing apparatus is used for a variety of purposes by an operator (user) who carries out industrial or commercial work. By way of example, in the case of an application for a distribution management system, the portable information processing apparatus is used in the work for collecting required items from a warehouse to display the items to be collected in the warehouse or register the collected items.

In the conventional portable information processing apparatus, the operator should significantly move the eyes to alternately watch electronic information displayed on the portable information processing apparatus and an object existing in the field. It is accordingly troublesome to visually check the relationship between the electronic information and the object. Further, the operator can not handle the object with hands while the portable information processing apparatus is manually operated; this results in poor workability.

An object of the present invention is thus to solve the above problems and to provide a technique that enables an operator to efficiently carry out another operation while observing a display of electronic information.

DISCLOSURE OF THE INVENTION

In order to attain at least part of the above object, a body mount-type information display apparatus according to the present invention comprises: a computer unit for generating information to be displayed; first attachment means for attaching said computer unit to a part of the body of the user; a display unit attachable to the head of the user for displaying the information generated by the computer unit to be observable by the user; and second attachment means for attaching the display unit to the head of the user. The display unit comprises: an image display element for displaying the information generated by the computer unit; and an optical system for refracting a first light beam representing an image displayed on the image display element to enable the user to observe a magnified virtual image of the displayed image, and for causing the first light beam and a second light beam from an external field of vision to enter the eyes of the user. Both the first light beam representing the image including electronic information and the second light beam from the outside enter the eyes of the user. The user can thus observe the display of electronic information simultaneously with the outside view, thereby efficiently carrying out a required work.

The optical system may comprise: a magnifying optical system for refracting the first light beam representing the image displayed on the image display element to enable the user to observe a magnified virtual image of the displayed image; and a see-through optical system for transmitting the second light beam and enabling the transmitted second light beam and the first light beam to enter the eyes of the user.

The magnifying optical system may be a single-eye optical system for leading the first light beam to one eye; the see-through optical system comprises a translucent plane mirror arranged in front of both the eyes of the user; and the display unit further may comprise: switching means arranged to be able to move the magnifying optical system to be positioned in front of either one of the left and right eyes of the user. This structure enables the user to select an eye for simultaneous observation of the electronic information and the outside view and accordingly improves the workability of the body mount-type information display apparatus. The translucent plane mirror also exists in front of the eye without the magnifying optical system. This balances the light beams entering the two eyes and facilitates the simultaneous observation of the image and the outside view.

The magnifying optical system and the see-through optical system may be single-eye optical systems for leading the first light beam and the second light beam to one eye; and the display unit may further comprise: switching means arranged to be able to move the magnifying optical system and the see-through optical system to be positioned in front of either one of the left eye and the right eye of the user. This structure also enables the user to select an eye for observing the electronic information and the outside view.

The optical system may be implemented by a translucent concave mirror arranged in front of the eye of the user.

The computer unit may comprise: a power source; power management means for regulating power consumption of the power source; and power management switching means for switching a working condition of the power management means depending upon whether or not the computer unit is attached to the first attachment means. When the computer unit is not attached to the body, the working condition of the power management means is switched to reduce the power consumption.

The computer unit may comprise: an interface for connecting the computer unit with peripheral equipment to construct a desktop computer system when the computer unit is not attached to the body of the user, the peripheral equipment including at least one of a keyboard, a first pointing device, a display device, and a printer.

The computer unit may further comprise: a second pointing device that is usable at least when the computer unit is not attached to the body of the user.

The computer unit may also comprise: information communications means for communicating with an external host computer to receive a desired piece of information from the host computer. Various pieces of information can be received from the host computer and displayed in the display unit accordingly.

The piece of information received from the host computer is, for example, image information representing an image displayed on the display unit.

The information communications means may supply positional information to the host computer, the positional information including at least one of a direction, a visual angle, and a distance of an outside object seen from the user, and the information communications means may receive from the host computer the image information representing an image processed according to the positional information, thereby effecting to display the image on the display unit in harmony with the object. Accordingly, the user can observe the displayed image having the size and position harmonized with the object.

The positional information may be supplied from a global positioning system. This arrangement readily informs the user of the positional relationship between the user and the object.

The information communications means may instruct the host computer to change a size of an image displayed on the display unit and receive the image information representing the image of changed size, thereby effecting to display the image on the display unit in harmony with a size of an object in the outside. The user can observe the object together with the image that is harmonized with the size of the object accordingly.

The computer unit may comprise modulation means for modulating a video signal representing an image to be displayed on the display unit and transmitting the modulated video signal to the display unit; and the display unit may comprise demodulation means for receiving and demodulating the modulated video signal. This structure does not require wiring between the computer unit and the display unit and thus facilitates movement of the user.

The body mount-type information display apparatus may further comprise: a magnetic pointing device for specifying a position in an image displayed on the display unit, in response to an intensity of a magnetic field at a position of a magnetic device attached to part of a hand of the user. Alternatively, the apparatus may comprise an optical pointing device for capturing a light beam output from an emission device attached to part of a hand of the user, thereby specifying a position in an image displayed on the display unit. These pointing devices enable the user to specify a desired position in the displayed image simply by moving the position of the hand.

The body mount-type information display apparatus may further comprise: a sensor for detecting an object that is not directly observable with naked eyes; wherein the computer unit displays an image of the object detected by the sensor on the display unit. Accordingly, the user can observe the image of the detected object while detecting the object with the sensor.

The body mount-type information display apparatus may further comprise: bar code reading means disposed close to the display unit for reading a bar code existing in the outside, wherein the computer unit displays an image corresponding to the scanned bar code on the display unit. The user can readily observe information corresponding to the bar code in the work field accordingly.

In the body mount-type information display apparatus, the display unit may comprise display switching means for switching an on/off state of an image display on the display unit according to a movement of the eyes of the user. This structure switches the on/off state of the display without a manual operation to display an image only when required, thereby further improving the working efficiency.

The present invention is further directed to an information display method, using the body mount-type information display apparatus, for displaying an image including information in harmony with an object in the outside on a display screen of the display unit.

BRIEF DESCRIPTION OF THE DRAWINGS

FIG. 6 conceptually illustrates a radio interface used for connecting the body mount-type information display apparatus of the present invention to a network;

FIGS. 15(a)–15(b) shows a block diagram showing another available structure of the interface circuit used in the body mount-type information display apparatus of the third embodiment;

FIGS. 16(a)–16(b) show a magnetic field-based input means;

FIGS. 17(a)–17(b) show an infrared emission-based input means;

BEST MODES OF CARRYING OUT THE INVENTION

A. First Embodiment

Figure 1A:
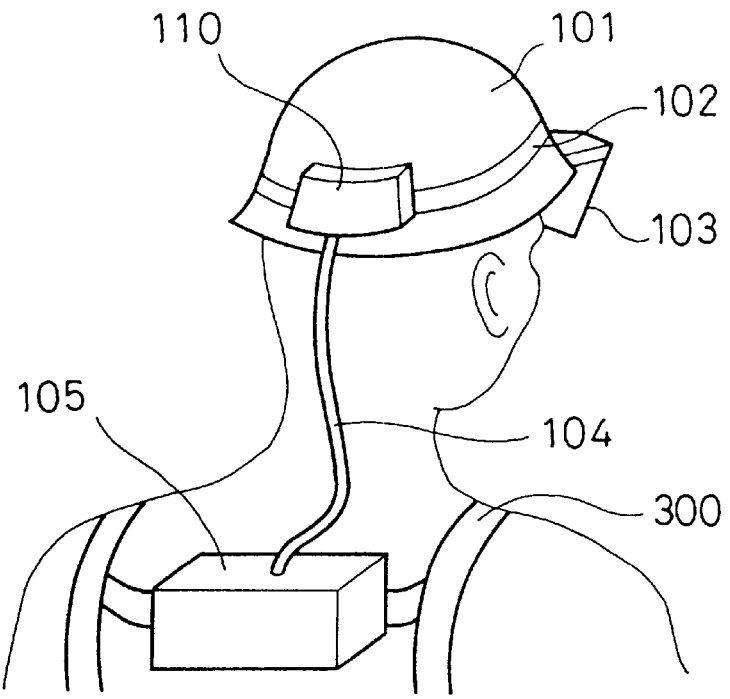
FIGS. 1(a)–1(b) conceptually illustrate the structure of a body mount-type information display apparatus as a first embodiment according to the present invention.

FIG. 1 conceptually illustrates the structure of a body mount-type information display apparatus as a first embodiment according to the present invention. The body mount-type information display apparatus (or portable data display apparatus) comprises a display unit 103 which is attachable to the head of an operator, and a control circuit unit 105 which is attachable to a part of the body of the operator.

The display unit 103 is fixed to a front portion of a helmet 101 (that is, in front of the eyes of the operator) by means of an elastic head strap 102, such as a rubber band. An interface unit 110 that is electrically connected with the display unit 103 is fixed to a rear portion of the helmet 101 by means of the head strap 102. The head strap 102 accordingly has wiring for connecting the interface unit 110 with the display unit 103. The display unit 103 may be directly attached to the head of the operator by means of the head strap 102 without using the helmet 101.

The control circuit unit 105 is fixed to the back of the operator by means of a shoulder belt-like wear strap 300. The control circuit unit 105 and the interface unit 110 are connected with each other via an interface cable 104. The control circuit unit 105 is electrically connected to the display unit 103 via the cable 104, the interface unit 110, and the wiring of the head strap 102. The control circuit unit 105 may be attached to any part of the body, for example, the chest or the head.

The control circuit unit 105 is a computer unit including a microprocessor, memories, communications interfaces, and a rechargeable battery, which are all accommodated in one casing and not shown here. The internal structure of the control circuit unit 105 will be discussed later.

Figure 1B:
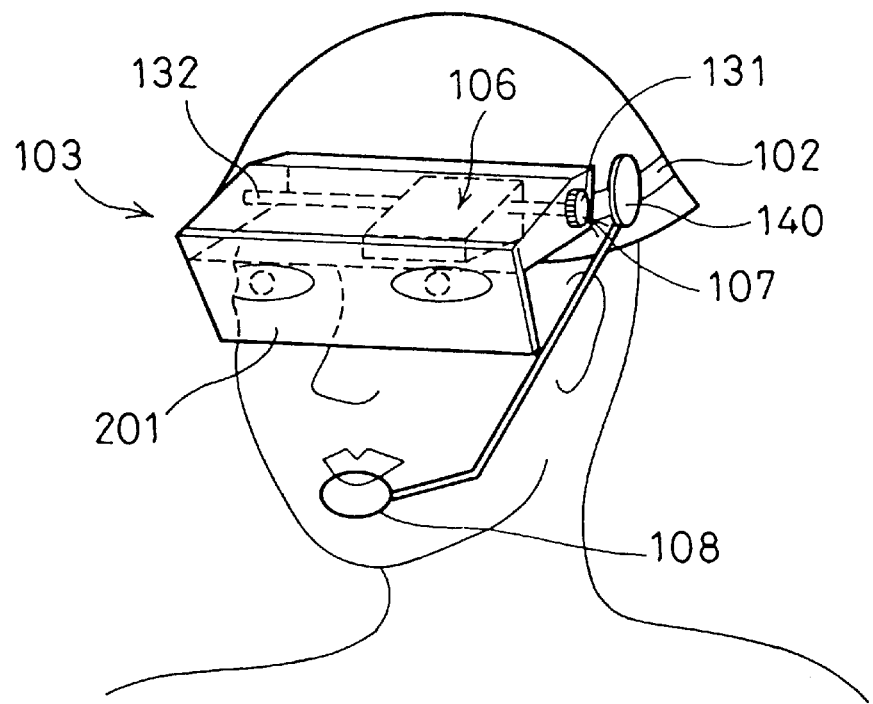

FIG. 1(b) shows the internal structure of the display unit 103. The display unit 103 includes a magnifying optical system 106, a switching mechanism 107, a microphone 108, and a half mirror 201. The magnifying optical system 106 and the half mirror 201 have functions of displaying an image including electronic information generated by the control circuit unit 105 and magnifying the displayed image for visual recognition by the operator. The magnifying optical system 106 is for a single eye. The half mirror 201 is, on the other hand, for both eyes and is a translucent plane mirror arranged immediately before the eyes and inclined at an angle of approximately 45 degrees.

The switching mechanism 107 is a screw mechanism having a function of shifting the magnifying optical system 106 leftward or rightward. The switching mechanism 107 includes an operation knob 130 manually operated by the operator and a male screw element 131 connecting with the operation knob 130. The magnifying optical system 106 is provided with a female screw element (not shown) mating with the male screw element 131. When the operator rotates the operation knob 130, the male screw element 131 rotates and eventually shifts the magnifying optical system 106 with the female screw element either rightward or leftward. A manual rotation of the operation knob 130 of the switching mechanism 107 enables the magnifying optical system 106 to be positioned in front of either the right eye or the left eye of the operator. The side-to-side switching mechanism 107 is applied not only to the selection of one eye for the convenience of the operator but also to a variety of other cases. By way of example, when the working area exists on the left side of the operator, the arrangement of the magnifying optical system 106 in front of the right eye makes the left-side working area more conspicuous; and vice versa.

The microphone 108 is fixed to the head strap 102 for fixing the display unit 103 to the head of the operator, by means of a clasp 140 such that the microphone 108 is pivotally movable around the clasp 140. The microphone 108 is used as a voice input means to give a voice instruction to the control circuit unit 105.

Figure 2A:
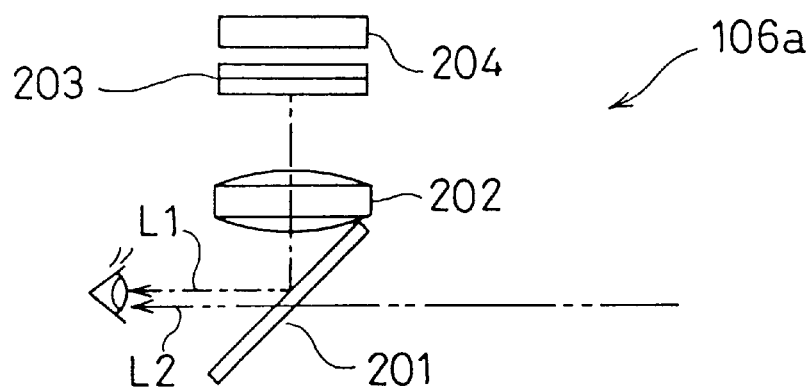
FIGS. 2(a)–2(c) show the structures of three different optical systems applicable for the display unit in the body mount-type information display apparatus of the first embodiment.

FIG. 2 shows the structures of three different optical systems applicable for the body mount-type information display apparatus of the first embodiment. A first magnifying optical system 106a shown in FIG. 2(a) includes a magnifying lens 202 arranged above the half mirror 201, a transmission type liquid crystal panel 203, and a back light 204. The liquid crystal panel 203 displays an image including electronic information generated by the control circuit unit 105 (see FIG. 1), in response to an image signal (or an information display signal) output from the control circuit unit 105. The image displayed on the liquid crystal panel 203 is illuminated with light from the back light 204, and a light beam L1 representing this image enters the magnifying lens 202. The magnifying lens 202 has a function of refracting the light beam L1, in order to enable the operator to observe a magnified virtual image, which is a magnification of the image displayed on the liquid crystal panel 203.

The half mirror 201 functions as a light composition means (or a see-through optical system) for combining the light beam L1 representing the image with a light beam L2 from an external field of vision. Namely the translucent half mirror 201 reflects the light beam L1 representing the image, while transmitting the light beam L2 from the external field of vision. These two different light beams L1 and L2 thus simultaneously enter the eye of the operator. The operator can accordingly see the state of the outside (for example, a working object) simultaneously with the electronic information. The half mirror 201 is made of a plate-like member covering both eyes as shown in FIG. 1(b). The eye which does not see the image generated by the control circuit unit 105 (the right eye in the example of FIG. 1(b)) sees only the outside through the half mirror 201. The light beam from the outside equally enters both the eyes, so that the operator can readily observe the state of the outside.

Figure 2B:
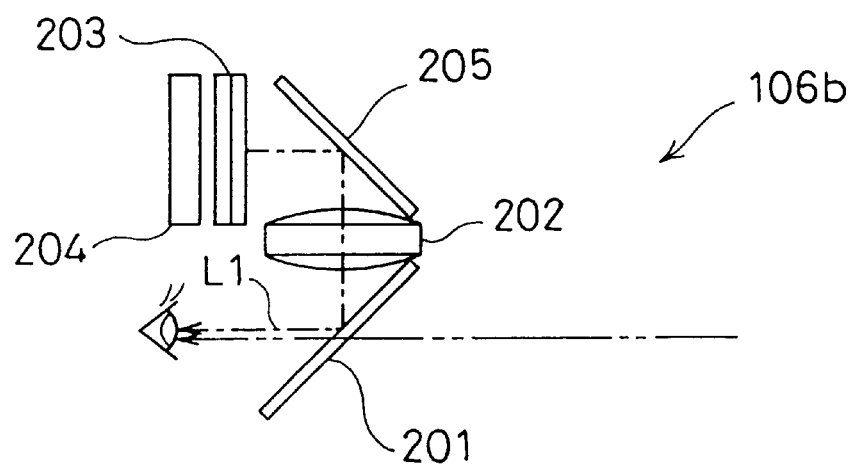

In a second magnifying optical system 106b shown in FIG. 2(b), a reflecting mirror 205 is interposed between the magnifying lens 202 and the liquid crystal panel 203, and the liquid crystal panel 203 and the back light 204 are rotated by 90 degrees toward the head of the operator. This structure enables the distance between the magnifying lens 202 and the image display plane of the liquid crystal panel 203 to be readily adjusted without enlarging the size of the magnifying optical system 106b in the vertical direction. This structure thus advantageously increases the degree of freedom in design of the magnifying optical system.

Figure 2C:
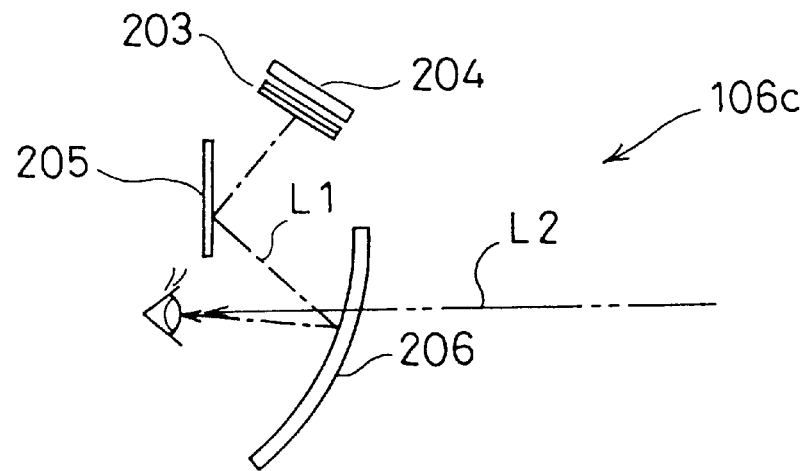

A third magnifying optical system 106(c) shown in FIG. 2(c) includes a translucent concave mirror 206 in place of the magnifying lens 202 and the half mirror 201. Namely the translucent concave mirror 206 has the functions of both the magnifying optical system and the see-through optical system. The concave mirror 206 is made of a translucent member of a uniform thickness having the reflectivity of several tens of %. The light beam L1 representing the image displayed on the liquid crystal panel 203 is led to the concave mirror 206 via the reflecting mirror 205 and reflected again from the concave mirror 206 to enter the eye. The light beam L2 from the outside passes through the concave mirror 206 to enter the eyes. The radius of the curved surface of the concave mirror 206 is set in the direction off the eyes of the operator. Namely the third magnifying optical system 106c is an off-axis optical system. Construction of the magnifying optical system as the off-axis optical system advantageously increases the degree of freedom in arrangement of optical elements.

As discussed above, the display unit 103 of the first embodiment has the see-through optical system implemented by the half mirror 201 (a translucent plane mirror), or the translucent concave mirror 206, or the like, so that the operator can simultaneously observe the image including the electronic information and the outside view without moving the eyes. The body mount-type information display apparatus attached to the body of the operator enables the operator to access the electronic information while letting both hands free. The operator can thus carry out a required operation while checking the electronic information, thereby improving the workability.

Figure 3A:
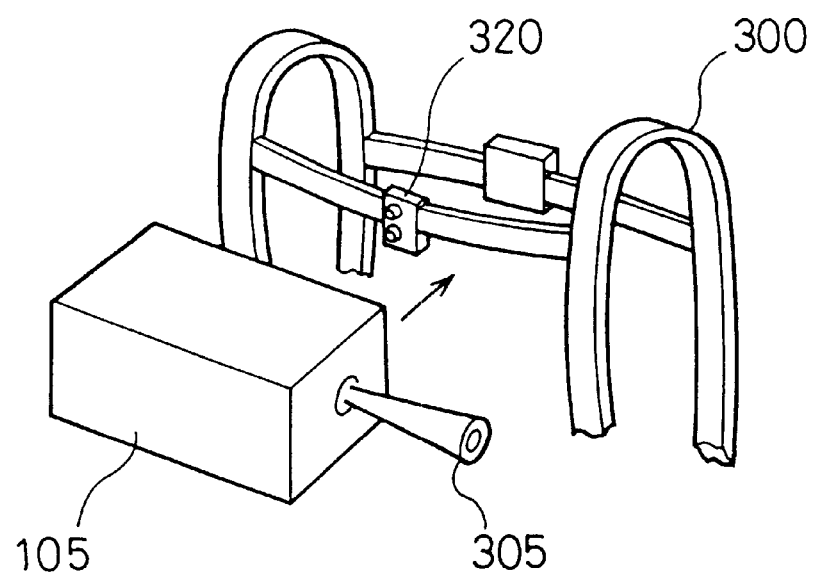
FIGS. 3(a)–3(b) show attachment of a control circuit unit 105 to a wear strap 300.
Figure 3B:
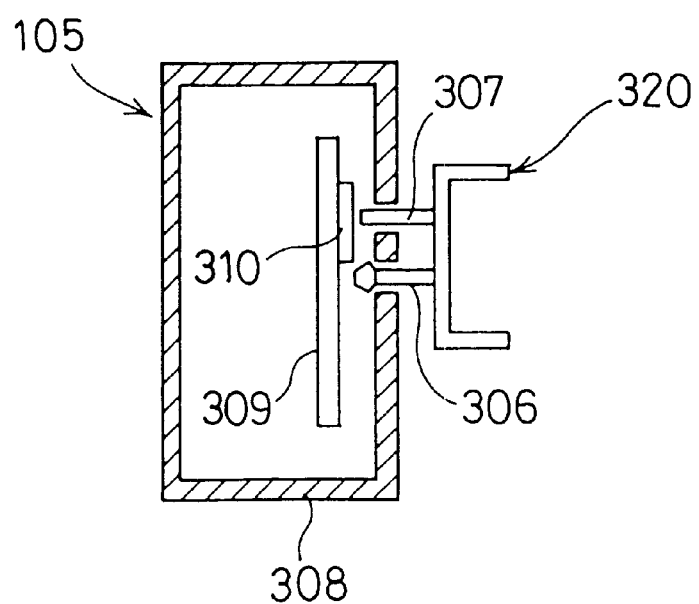

FIG. 3 shows attachment of the control circuit unit 105 to the wear strap 300. The control circuit unit 105 is detachably attached to the shoulder belt-like wear strap 300. The belt of the wear strap 300 has a fastener unit 320 that joins with the control circuit unit 105. FIG. 3(b) shows the control circuit unit 105 fixed to the belt of the wear strap 300. The fastener unit 320 includes a pin-like support member 306 for fixing the control circuit unit 105 and a pin-like projection element 307 for informing the control circuit unit 105 of attachment of the control circuit unit 105 to the wear strap 300.

A case 308 of the control circuit unit 105 has two openings respectively corresponding to the support member 306 and the projection element 307. Insertion of the control circuit unit 105 in the direction of the arrow of FIG. 3(a) causes the support member 306 to fit into the case 308 of the control circuit unit 105, thereby fixing the control circuit unit 105 to the wear strap 300. A power management switch 310 is disposed at a specific position corresponding to the projection element 307 on a circuit board 309 inside the case 308. When the control circuit unit 105 is attached to the wear strap 300, the projection element 307 switches on the power management switch 310. The circuit board 309 is provided with a power management circuit, which is not shown here. In case that the control circuit unit 105 is attached to the wear strap 300, the power management circuit is switched to the on state, which reduces the power consumption of the control circuit unit 105 to a relatively low level. In accordance with a concrete procedure, the power management circuit slows down the speed of the processor and cuts the power supply to the non-required interfaces, so as to extend the life of the internal power-supply battery. In case that the control circuit unit 105 is not attached to the wear strap 300, on the other hand, the power management circuit is switched to the off state, which effects a higher processing speed although resulting in a relatively large power consumption of the control circuit unit 105. In this manner, the projection element 307 and the power management switch 301 implements the function of the power management switching means.

Figure 4:
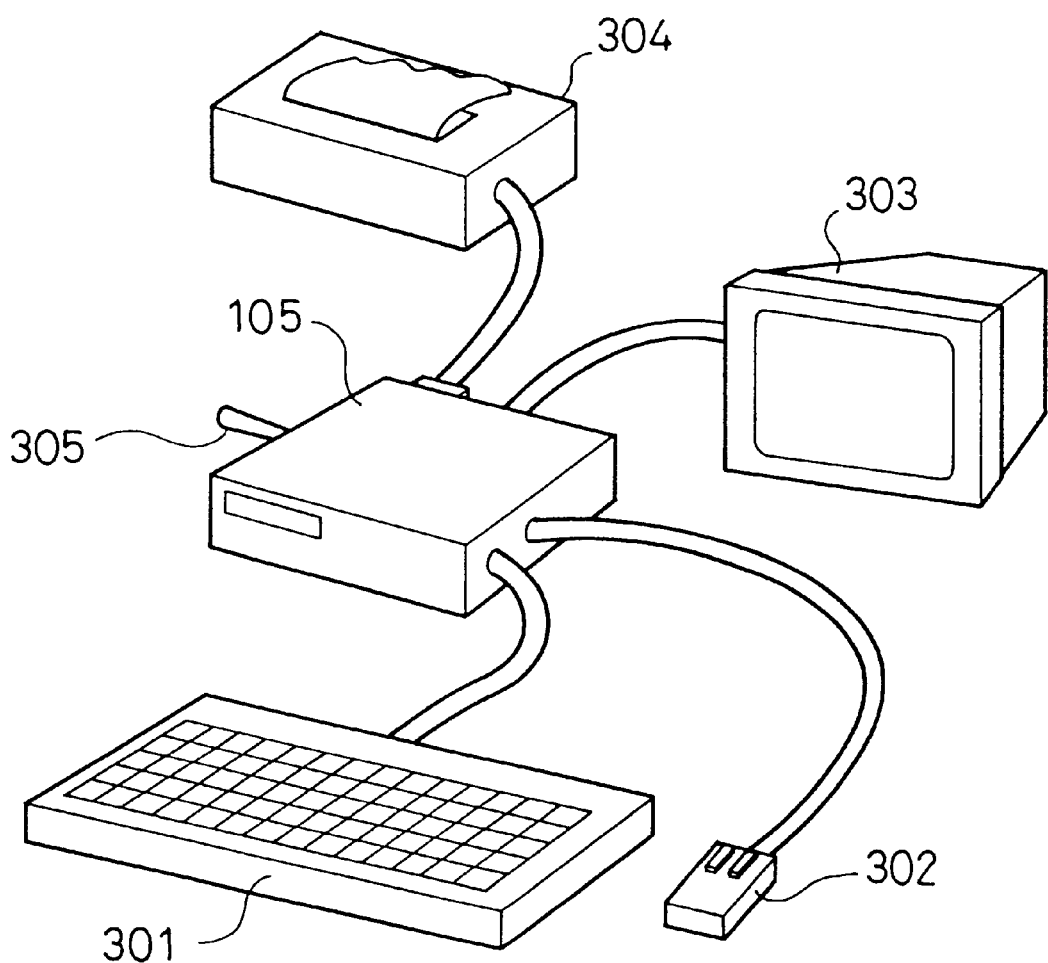
FIG. 4 conceptually illustrates the structure of the body mount-type information display apparatus of the first embodiment when used as a desktop computer.

FIG. 4 shows an exemplified structure of the apparatus in one application where the control circuit unit 105 of the first embodiment is used as a desktop computer. In the example of FIG. 4, the control circuit unit 105 is connected with a keyboard 301, a mouse 302, a CRT display 303, and a printer 304. The control circuit unit 105 has connectors and interface circuits (which are collectively referred to as the interfaces in a broad sense) for connecting with these peripheral devices. In the state of FIG. 4, the display unit 103 (see FIG. 1) attachable to the head is disconnected from the control circuit unit 105. The system shown in FIG. 4 can thus be used as a general desktop computer. When the control circuit unit 105 is not attached to the body of the operator but is used as part of the desktop computer, power can be obtained from the commercial power supply. In this case, the power management circuit is in the off state and set to the mode that executes arithmetic and logic operations at the highest possible speed.

As described before, when the control circuit unit 105 is attached to the wear strap 300, the power management circuit is switched on to improve the life of the battery. When the control circuit unit 105 is detached from the wear strap 300, on the contrary, the power management circuit is switched off and the control circuit unit 105 can be used as a desktop computer for high-speed processing as shown in FIG. 4. In this manner, the body mount-type information display apparatus of the first embodiment can readily form the computer system which has the suitable structure for its application.

In the examples of FIGS. 3 and 4, the control circuit unit 105 has a pointing tool 305. When the control circuit unit 105 is used separate from the human body as shown in FIG. 4, the mouse 302 is actuated preferentially. When attached to the human body, on the other hand, the pointing tool 305 is actuated. It is preferable that the control circuit unit 105 with the pointing tool 305 is attached on the chest of the operator. When the operator handles the lever of the pointing tool 305 with one hand and inclines the lever of the pointing tool 305 leftward, rightward, forward, or rearward, a certain position in the screen can be changed according to the inclined angle. For example, a pointing object, such as an arrow, can be moved to a certain position in the display screen, or the two-dimensional display space. The selected position is fixed, for example, by pressing the center of the lever.

Figure 5:
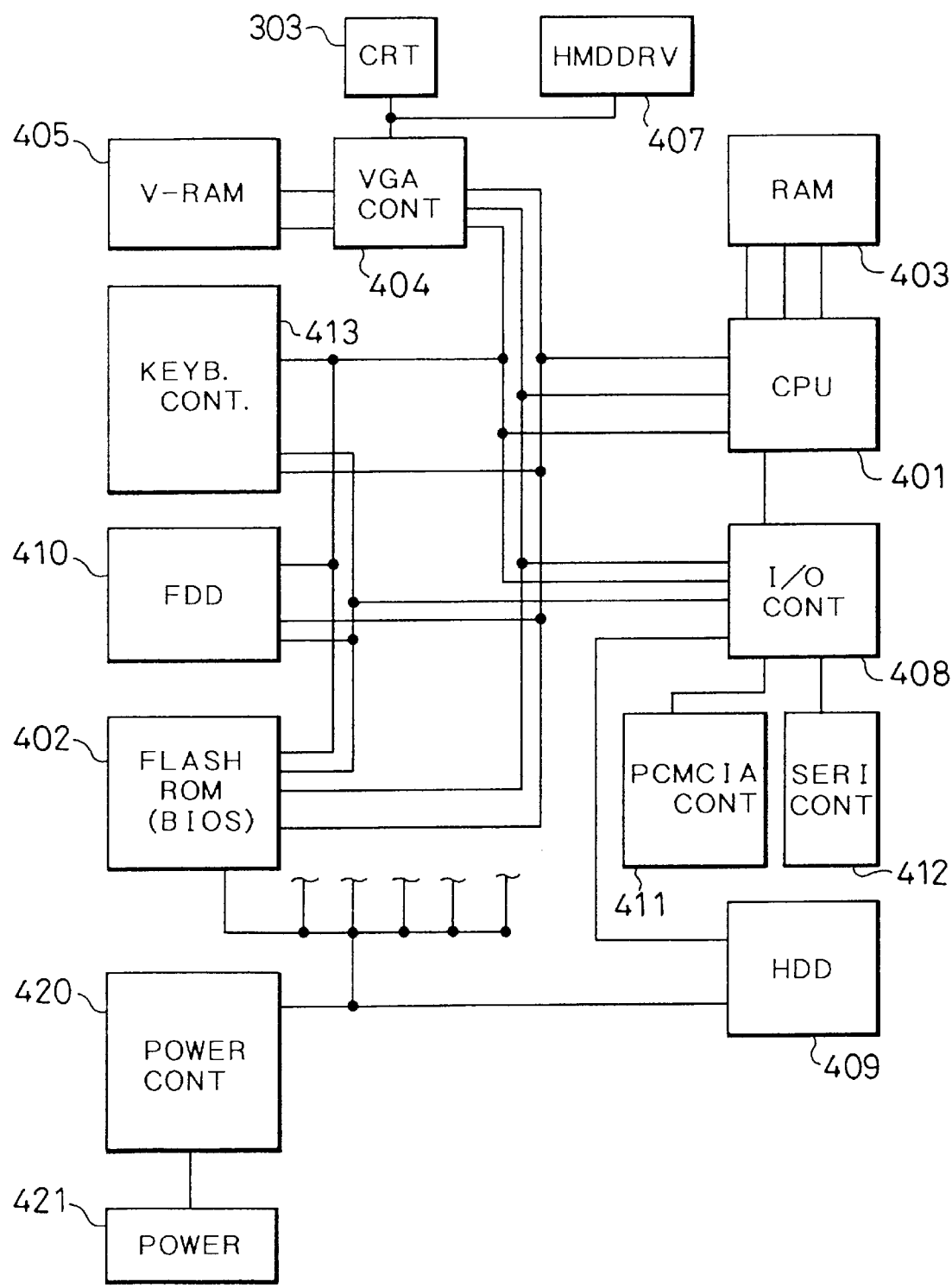
FIG. 5 is a block diagram showing the control circuit unit in the body mount-type information display apparatus of the first embodiment.

FIG. 5 is a block diagram illustrating the circuit structure of the control circuit unit 105. A CPU 401 is a microprocessor which has an address space of 16 bits or 32 bits and which is used in general personal computers. BIOS (basic I/O system) for driving the CPU 401 is stored in advance into a flash ROM 402. The contents of the ROM 402 can be copied and registered into a RAM 403. The RAM 403 has a sufficient memory capacity for the Windows operating system (trademark of Microsoft Corporation), for example, not less than 8 megabytes.

VGA controller 404 following the VGA standard (Video Graphics Array for 640×480 display pixels), which is a general display video standard, is used as the controller for controlling the display device. A video memory (V-RAM) 405 stores image data in the display area of the liquid crystal panel 203 (see FIG. 2). The VGA controller 404 outputs video signals representing images stored in the video memory 405. The video signals are transmitted to the CRT display 303 (see FIG. 4) and a display unit driving circuit 407. The display unit driving circuit 407 drives the liquid crystal panel 203 of the display unit 103.

An I/O controller 408 controls a variety of I/O interfaces including those for a hard disk drive 409 and a floppy disk drive 410. A card controller 411 in conformity with the PCMCIA (Personal Computer Memory Card International Association) standard is incorporated as a card-type interface. There is also provided an RS-232C serial interface 412. At least part of these circuits 409, 410, 411, and 412 may be omitted.

The control circuit unit 105 further includes a power management circuit 420 for controlling the power consumption of the respective circuits and a power circuit 421 including a rechargeable battery. The power circuit 421 is actuated when the projection element 307 switches on the power management switch 310 as discussed previously with the drawing of FIG. 3(b), and controls the operations of the respective circuits to reduce the power consumption of the control circuit unit 105. In the state that the control circuit unit 105 is attached to the human body, the time of power supply from the power circuit 421 can be extended.

FIG. 6 conceptually illustrates application of the body mount-type information display apparatus of the first embodiment as a network terminal. In the example of FIG. 6, the body mount-type information display apparatus is wirelessly connected to a host computer 804 in a local area network (LAN). A modem 430 for communications is inserted into a PCMCIA card slot of the body mount-type information display apparatus. The modem 430 wirelessly connects the body mount-type information display apparatus to the host computer 804.

Wireless connection of the body mount-type information display apparatus to the host computer 804 entrusts the host computer 804 with the operations requiring long processing time or involving large amounts of data, while the body mount-type information display apparatus carries out relatively simple operations. The system of this structure enables the required electronic information to be quickly displayed in the body mount-type information display apparatus.

FIG. 7 shows an exemplified display screen of the body mount-type information display apparatus of the first embodiment when applied for plant works. This example shows a display screen when an engineer in the plant relating to a plurality of technologies, such as mechanical engineering, electrical engineering, and communications, accesses a host computer to retrieve drawings and data.

Figure 7A:
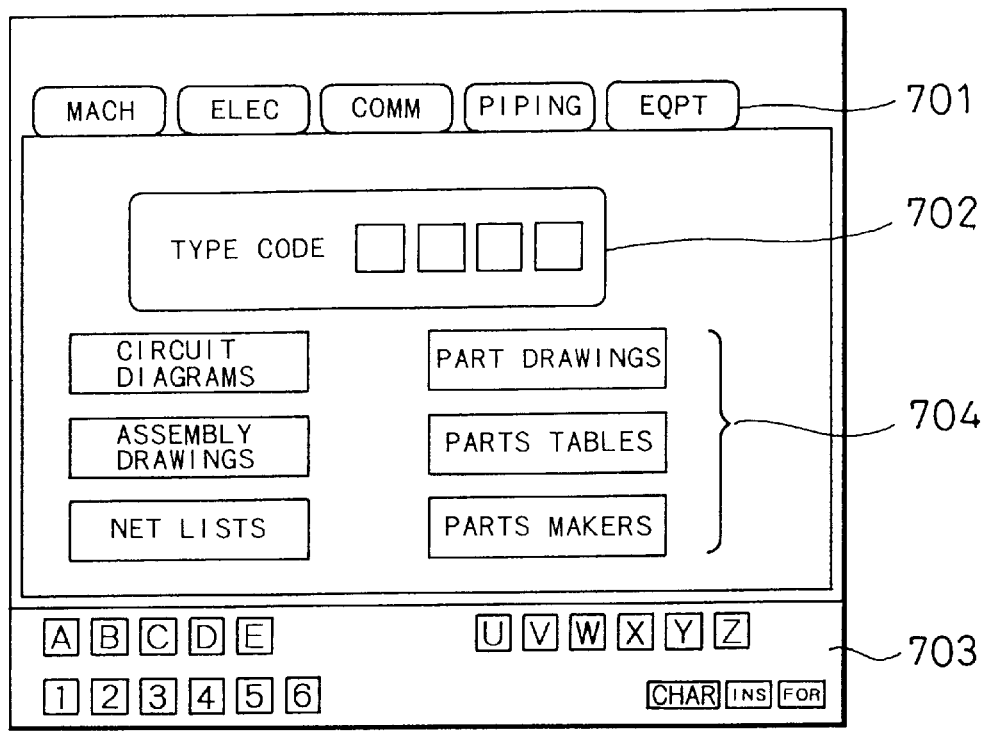
FIGS. 7(a)–7(b) show an exemplified display on the body mount-type information display apparatus of the present invention.
Figure 7B:
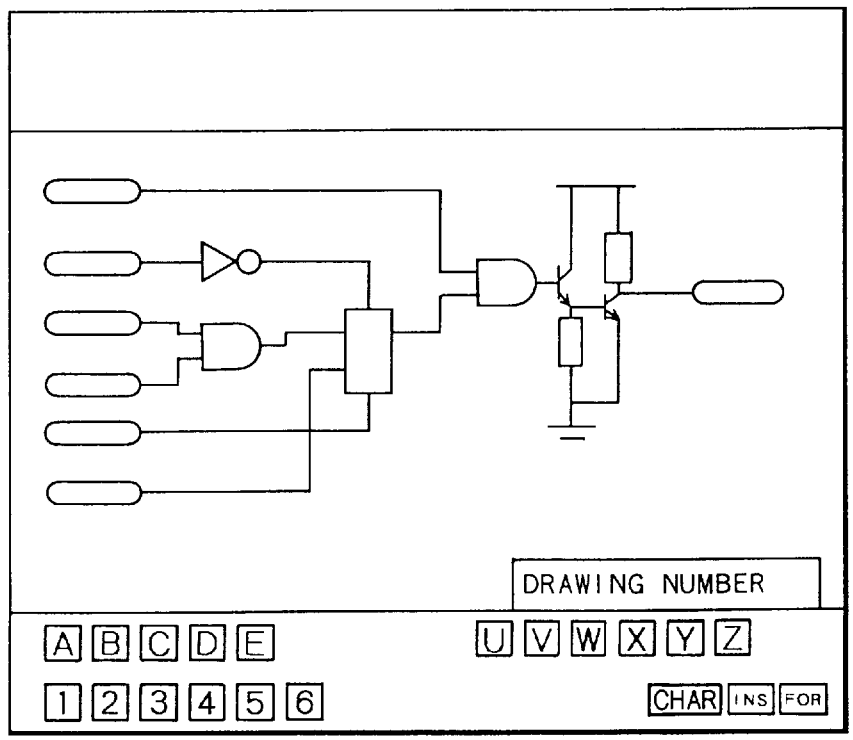

Referring to FIG. 7(a), the main screen has a menu 701 that enables a selection among options of machinery-related information, electronics-related information, communications-related information, piping-related information, and other equipment-related information of the plant. By way of example, it is assumed that an electrical engineer needs to check a circuit in the field. In this case, the engineer first selects the box of electronics from the menu 701 with a pointing tool. A plurality of selection keys 704 for enabling a selection of electronics-related information (including circuit diagrams, part drawings, and assembly drawings) are then displayed on the display screen as shown in FIG. 7(a). At this moment, the engineer selects characters among a character list 703, which is arranged on the lower portion of the screen, with the pointing tool and inputs the selected characters into a type code field 702, while selecting a required piece of information (for example, a circuit diagram) among the selection keys 704. As a result, a drawing as shown in FIG. 7(b) is displayed on the display unit 103. When the code of the required drawing is known, a direct input of the code from the character list 703 with the pointing tool enables the circuit diagram as shown in FIG. 7(b) to be immediately selected and displayed. Information, such as the circuit diagrams, may be stored in the hard disk 409 in the control circuit unit 105 (see FIG. 5) or registered in the host computer 804. In the latter case, the information, such as the circuit diagrams, is transmitted from the host computer 804 to the body mount-type information display apparatus via a radio interface as shown in FIG. 6.

The images of FIGS. 7(a) and 7(b) are displayed on the display unit 103 shown in FIGS. 1 and 2. This display enables the engineer to simultaneously observe the displayed drawing and the actual circuit existing in the work field to check the circuit, for example.

Such application of the body mount-type information display apparatus of the first embodiment enables the engineer to readily obtain necessary drawings for the check of the actual circuit in the work field. There are an extremely large number of electronic parts tables in some cases. When information related to the parts of electronic circuits is converted to electronic data and registered in advance in the host computer 804, the engineer can readily obtain a required piece of information (for example, an LSI pin number) in the work field. This remarkably improves the workability in the work field. The workability is further improved because any significant movement of the eyes is required to see both the working object and the image display.

Figure 8A:
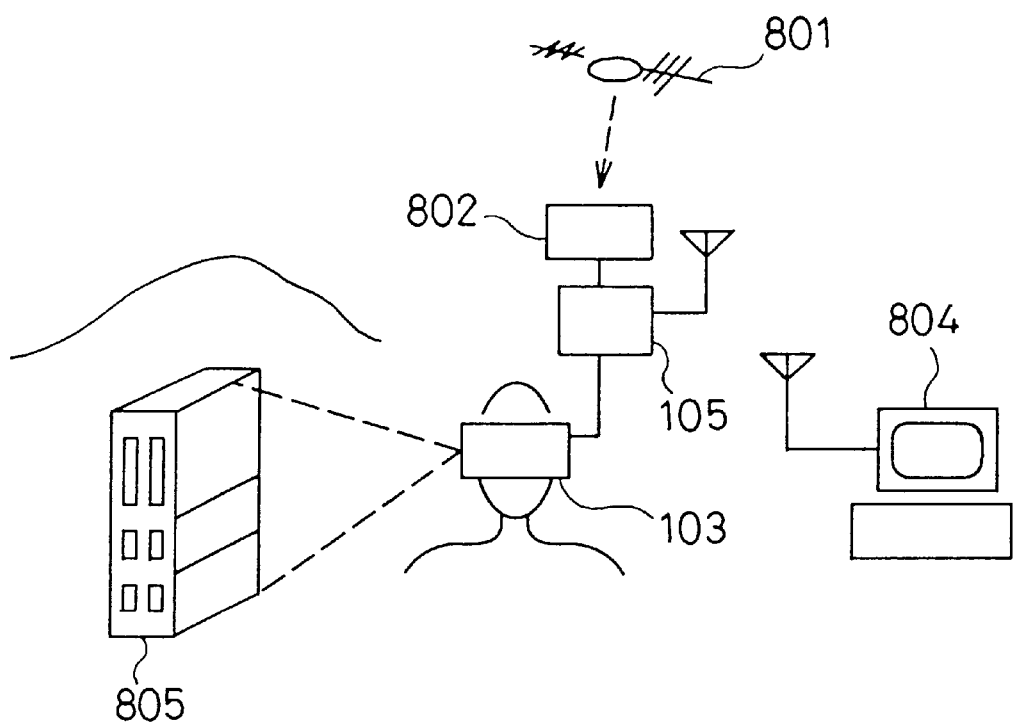
FIGS. 8(a)–(b) show an application of the body mount-type information display apparatus of the present invention to construction works.

FIG. 8 conceptually shows an application of the body mount-type information display apparatus of the first embodiment to the field of construction. FIG. 8(a) shows a general structure of the system. A portable GPS (global positioning system) 802 that is satellite-based position detecting means for detecting the position of the operator is connected to the body mount-type information display apparatus. The operator can receive information on the location of the operator from a satellite 801 through the portable GPS 802. Signals representing the detected position and direction are transmitted through a radio communications means to the host computer 804 (or the body mount-type information display apparatus). The position of a building 805 is registered in advance in the host computer 804.

Figure 8B:
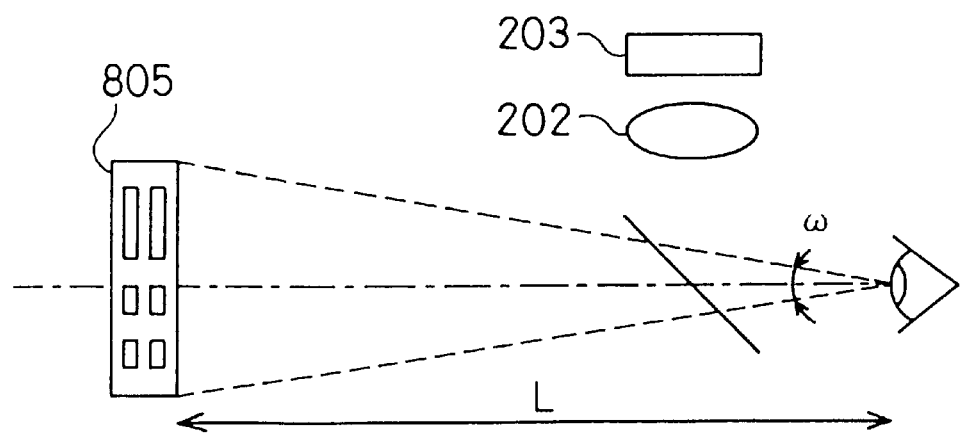

FIG. 8(b) shows the positional relationship between the operator and the building 805. The host computer 804 computes positional information representing the positional relationship between the operator and the building 805, based on the signals transmitted from the portable GPS 802 (or from the body mount-type information display apparatus). The positional information includes the direction from the operator to the building 805, a distance L between the building and the operator who monitors the building, and a perspective angle ω. The host computer 804 creates image information representing a perspective of the building 805 observed from the position of the operator based on the positional information and transmits the image information to the body mount-type information display apparatus. The perspective of the building 805 is then displayed three-dimensionally on the liquid crystal panel 203 of the display unit 103 attached to the operator in the field.

In the system shown in FIG. 8, the cooperation of the portable GPS 802 and the host computer 804 enables the operator in the field to observe the perspective of the building 805 according to the point of view of the operator. The operator can simultaneously observe the outside view and thus readily compare the displayed perspective with the actual scene of the outside. Such observation prior to the start of construction of the building 805, for example, enables the operator to assess the harmony of the building 805 with the surrounding environment. Such observation after completion of the building 805 enables the operator to determine whether or not the building 805 has been constructed according to the plan.

A variety of electronic information, such as drawings in the respective processes and color information, other than the perspective are also observable with the outside view in the field of construction.

The control circuit unit 105 may display an expanded or compressed image of the object (building 805) on the display unit 103 without communications with the host computer 804, thereby enabling the object to be displayed in a specific size in harmony with the outside view. This function allows an image to be immediately displayed in good agreement with the outside view.

As discussed above, the system shown in FIG. 8 displays an image of the building together with the outside view in the field, thus enabling the operator to take into account the harmony of the planned building with the environment of the field and readily assess the plan. This system also facilitates confirmation of the agreement between the building under construction and the plan.

Figure 9A:
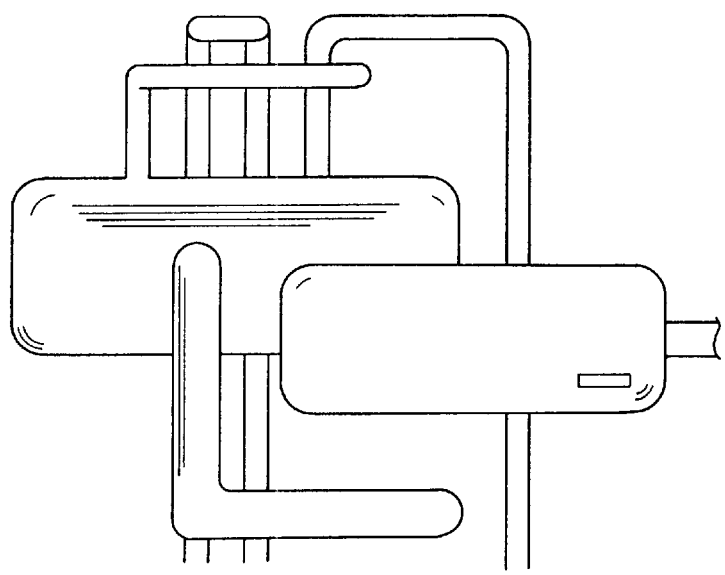
FIGS. 9(a)–9(b) show an application of the body mount-type information display apparatus of the present invention to plant monitoring duties.
Figure 9B:
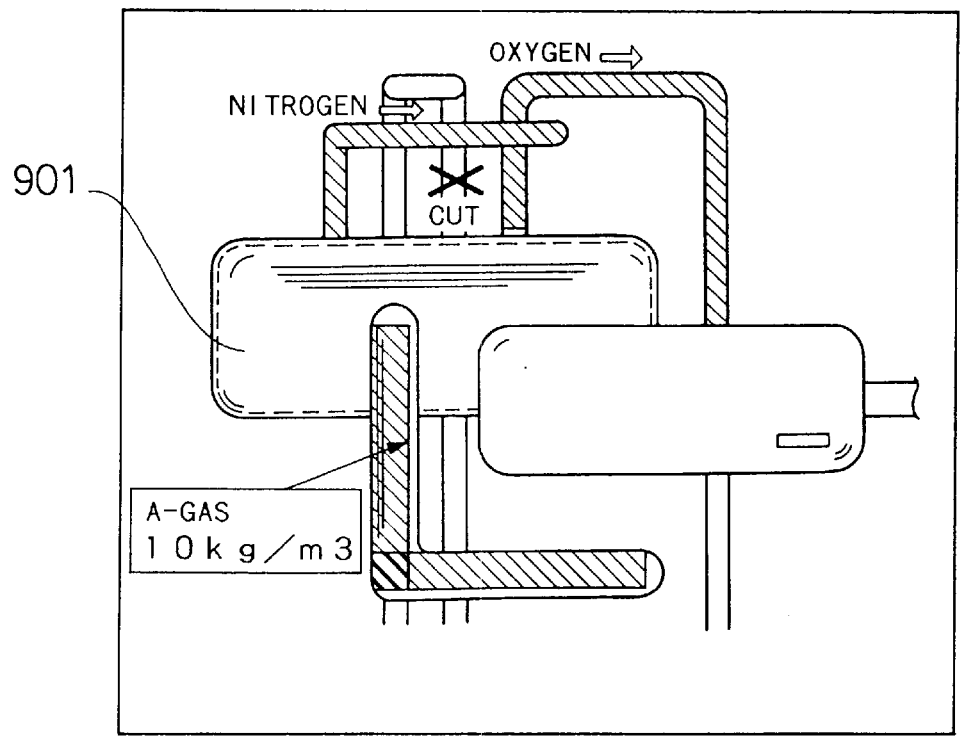

FIG. 9 shows another example, in which the body mount-type information display apparatus of the first embodiment is applied to the maintenance and other works in plant piping. FIG. 9(a) shows an actual layout of a complicated piping system, and FIG. 9(b) shows a display screen, on which the actual layout of the piping system and electronic information relating to the piping system are displayed in an overlapping manner.

In the field of the complicated piping system, it is difficult for the operator to judge a variety of conditions at once; for example, the type of the fluid in each pipe, the direction of the flow in each pipe, and the current state of each pipe, that is, in use or not. The display of the actual piping system and the electronic information relating to the piping system in an overlapping manner as shown in FIG. 9(b) immediately gives various information relating to the piping system to the operator. In accordance with a concrete procedure, for example, the operator moves the eyes to the position of a large object, such as a tank 901. An image representing the outline of the object (shown by the broken line in FIG. 9(b)) is then displayed on the display unit 103. The operator adjusts the position of the outline image to the position of the actual tank 901 and causes the host computer 804 (or the control circuit unit 105) to execute the processing of expanding or contracting the outline image if necessary. The expansion or contraction of the image is implemented by executing expansion or contraction on the image data representing the image displayed in the display unit 103. An expanded image is prepared by interpolating additional pixels between the original pixels. A contracted image is prepared, on the other hand, by skipping the pixels. In this manner, the first embodiment effects arbitrary selection of the image size. The user can thus readily match the size of the displayed image to the size of the object in the outside view.

After the positioning process, electronic information relating to the piping system is displayed on the display unit 103. The electronic information is transmitted from the host computer 804 to the body mount-type information display apparatus when required. In the example of FIG. 9(b), the type of the fluid in each pipe (nitrogen, oxygen, or A-gas), the direction of the flow in each pipe, and the type of the gas and the internal pressure in each pipe are shown at the corresponding positions in the piping system.

As discussed above, in the field of the piping system, the actual piping section and the related electronic information are displayed in an overlapped manner, so that a variety of information, such as the direction of the flow in each pipe, the current state of each pipe, that is, in use or not, and the type of the gas flowing in each pipe, can be readily visualized. The display also informs the operator of the accurate position of the pipe to be repaired. This effectively prevents the wrong operations by the operator and ensures the safe and secure operations.

Figure 10:
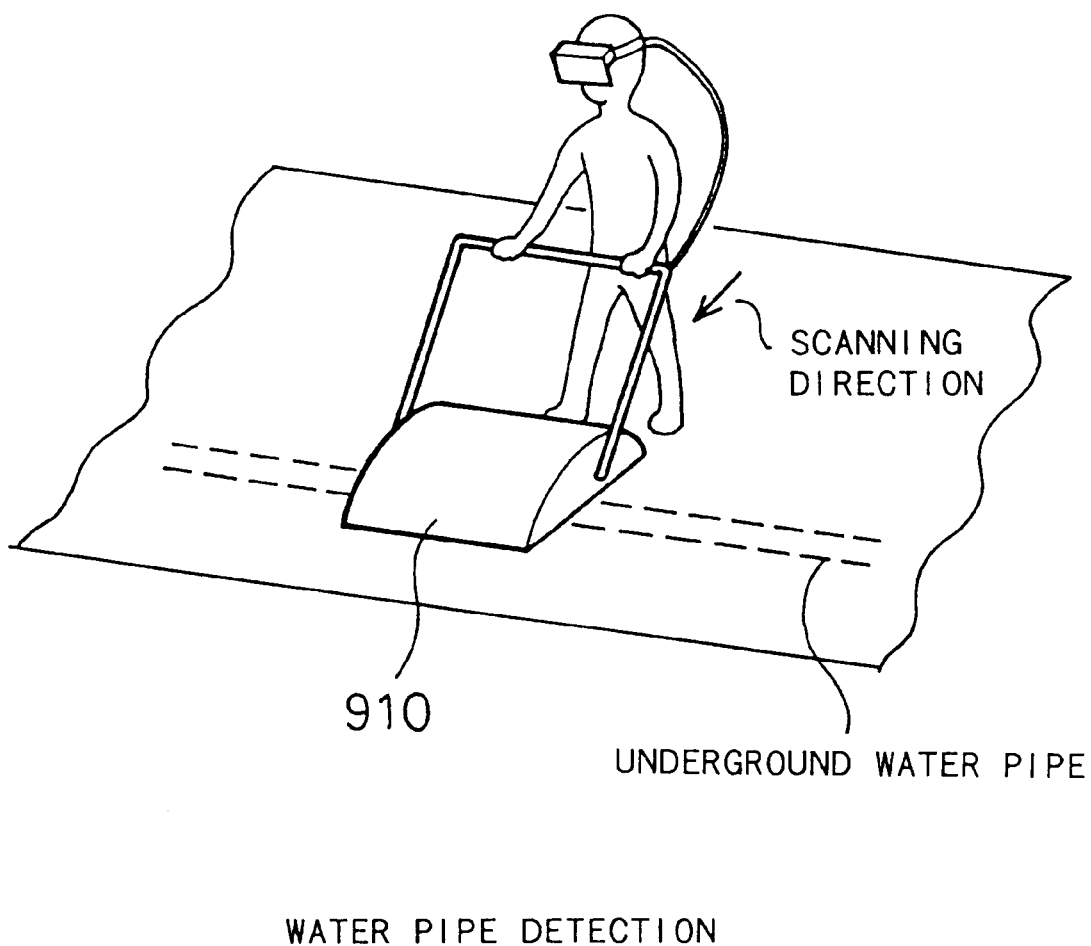
FIG. 10 shows an application of the body mount-type information display apparatus of the present invention to industrial measurement.

FIG. 10 shows still another example, in which the body mount-type information display apparatus of the first embodiment is applied to industrial measurement. In this example, the body mount-type information display apparatus is connected to a sensor unit 910, such as an ultrasonic sensor, and used as an examination system for examining the position of a water pipe buried in the earth. The operator pushes the sensor unit 910 to scan the ground. The video image obtained as a result of scanning is displayed on the display unit 103. The operator can thus observes the result while scanning the sensor unit 910.

Since the conventional system displays the video image obtained as a result of scanning on a monitor which is located at a separate position, another operator who observes the monitor is required in addition to the operator who scans the sensor unit 910. The operator who is observing the monitor should give an oral signal indicating the existence of a water pipe and inform the other operator who is scanning the sensor unit 910 of the position of an underground water pipe. In the process of examining a water pipe shown in FIG. 10, on the other hand, one operator can observe the resulting image while simultaneously scanning the sensor unit 910. This arrangement thus enables the operator to detect the position of a water pipe more readily and accurately. Another advantage is to shorten the time required for that operation.

Various sensors are available for detecting an object which the operator can not directly observe with the naked eyes. Another example of industrial measurement using such a sensor is in the field of weld defect examination. Application of the body mount-type information display apparatus of the first embodiment to industrial measurement and detection enables the operator to immediately observe the image of the object, thereby effecting efficient and accurate measurement and detection.

Figure 11:
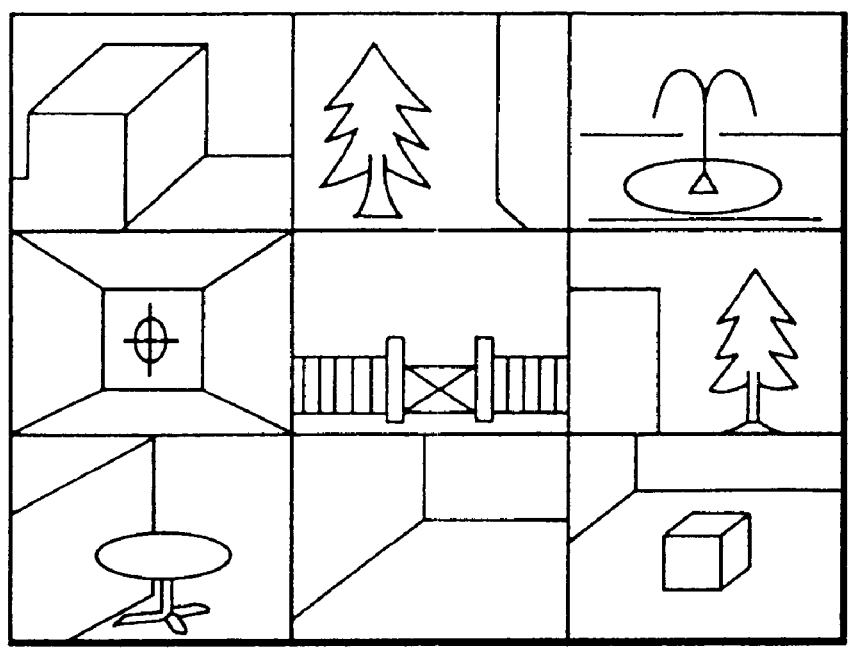
FIG. 11 shows an application of the body mount-type information display apparatus of the present invention to guard duties.

FIG. 11 shows a display screen when the body mount-type information display apparatus of the first embodiment is used for the guard duties in a building. When the guard keeps watch on the inside and outside of the building, monitor cameras are generally installed at a plurality of positions. A plurality of monitors are set in a security room, and the guard monitors the video images displayed on the respective monitors as shown in FIG. 11. The guard patrols the inside and the outside of the building at predetermined time intervals. In the conventional system, when the watch with monitors is required during the patrol, another guard should watch the monitors in the security room.

In the guard duties using the body mount-type information display apparatus of the first embodiment, on the other hand, the guard can patrol the building while observing the video images of the respective positions as shown in FIG. 11 displayed on the body mount-type information display apparatus. During the patrol, the guard can immediately recognize and deal with an abnormality or emergency occurring at a position different from the current position of the guard.

B. Second Embodiment

Figure 12:
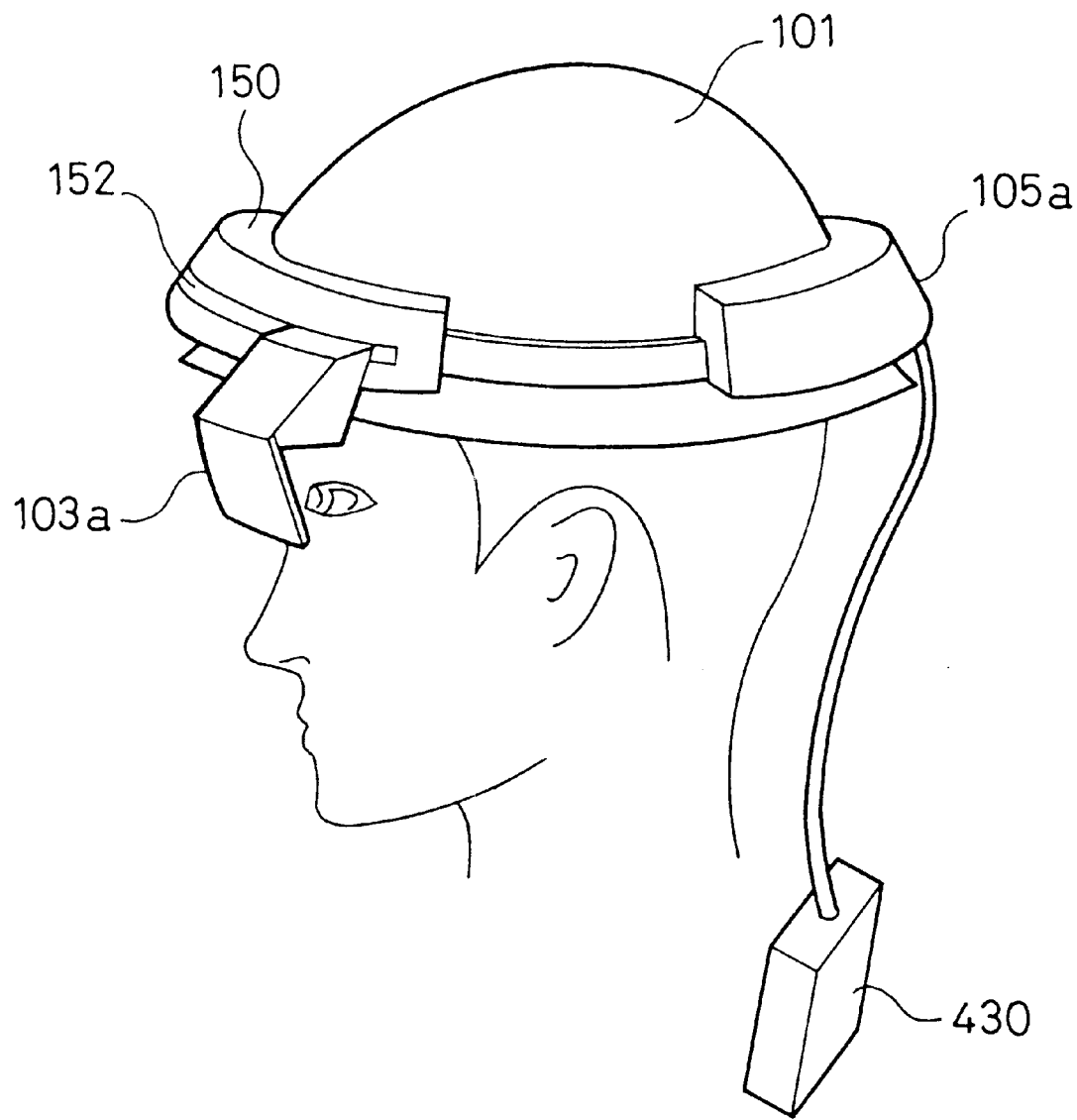
FIG. 12 conceptually illustrates the structure of another body mount-type information display apparatus as a second embodiment according to the present invention.

FIG. 12 conceptually shows another body mount-type information display apparatus as a second embodiment according to the present invention. The body mount-type information display apparatus of the second embodiment has a display unit 103a for a single eye arranged in front of a helmet 101 and a control circuit unit 105a fixed behind the helmet 101. The display unit 103a is fitted in a support member 150 attached to the front portion of the helmet 101 to be movable along a groove 152 of the support member 150. The operator manually presses and moves the display unit 103a, so as to position the display unit 103a in front of either the left eye or the right eye. A battery 430 is attached to the waist of the operator. This configuration decreases the weight of the control circuit unit 105a and attains the weight balance with the display unit 103a for the favorable attachment to the head.

In the second embodiment, the eye without the display unit 103a directly sees the outside view but not via a half mirror. The structure of the second embodiment accordingly enables clearer observation of the outside view, while the structure of the first embodiment enables observation of the electronic information displayed on the display unit 103 and the outside view in a well-balanced state.

C. Third Embodiment

Figure 13:
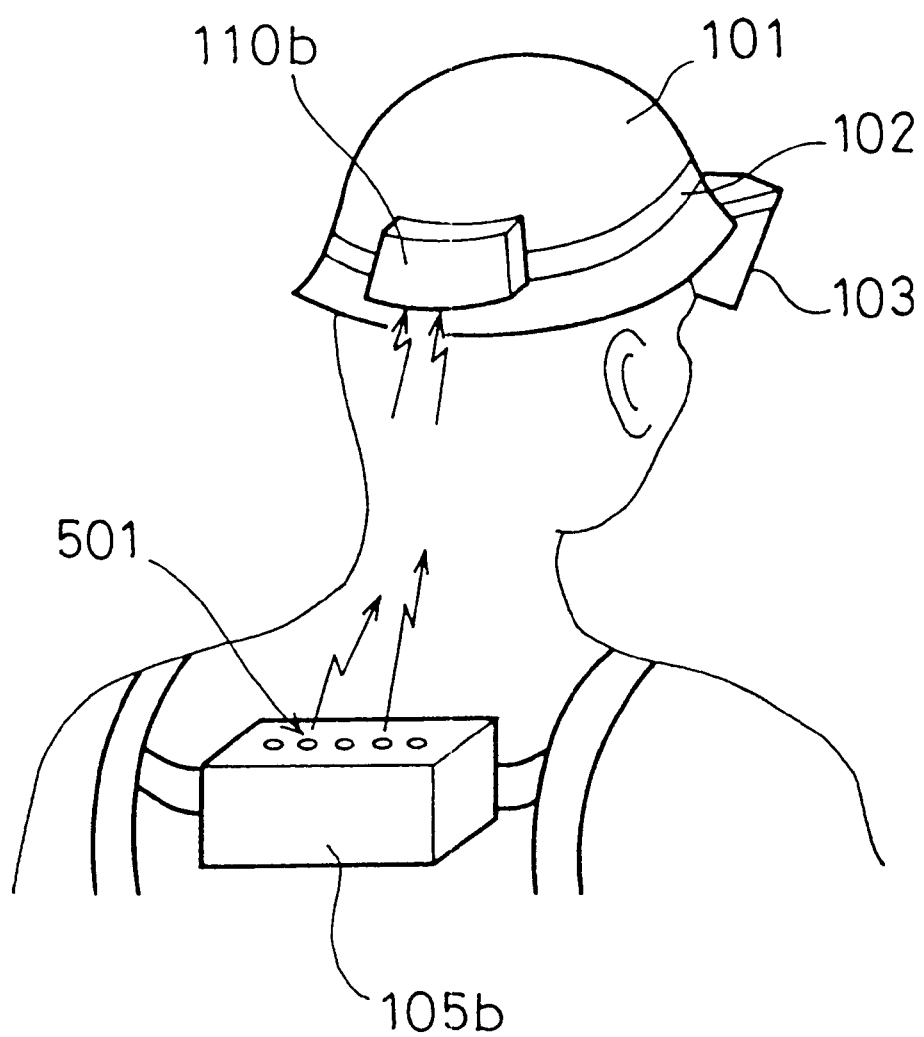
FIG. 13 conceptually illustrates the structure of still another body mount-type information display apparatus as a third embodiment according to the present invention.

FIG. 13 conceptually shows still another body mount-type information display apparatus as a third embodiment according to the present invention. The body mount-type information display apparatus of the third embodiment is a modification of the first embodiment shown in FIG. 1. In the third embodiment, a control circuit unit 105b and an interface unit 110b are not connected via wiring, but an infrared LED 501 for emitting infrared rays functions to transmit a variety of signals from the control circuit unit 105b to the interface unit 110b. Electromagnetic waves other than the infrared rays may be used for the transmission of signals between the interface unit 10*b* (or the display unit 103) and the control circuit unit 105*b*.

The structure of the third embodiment does not have any wire between the display unit 103 and the control circuit unit 105*b* suspended from the head (helmet 101), thereby facilitating the manual operations of the operator.

Figure 14:
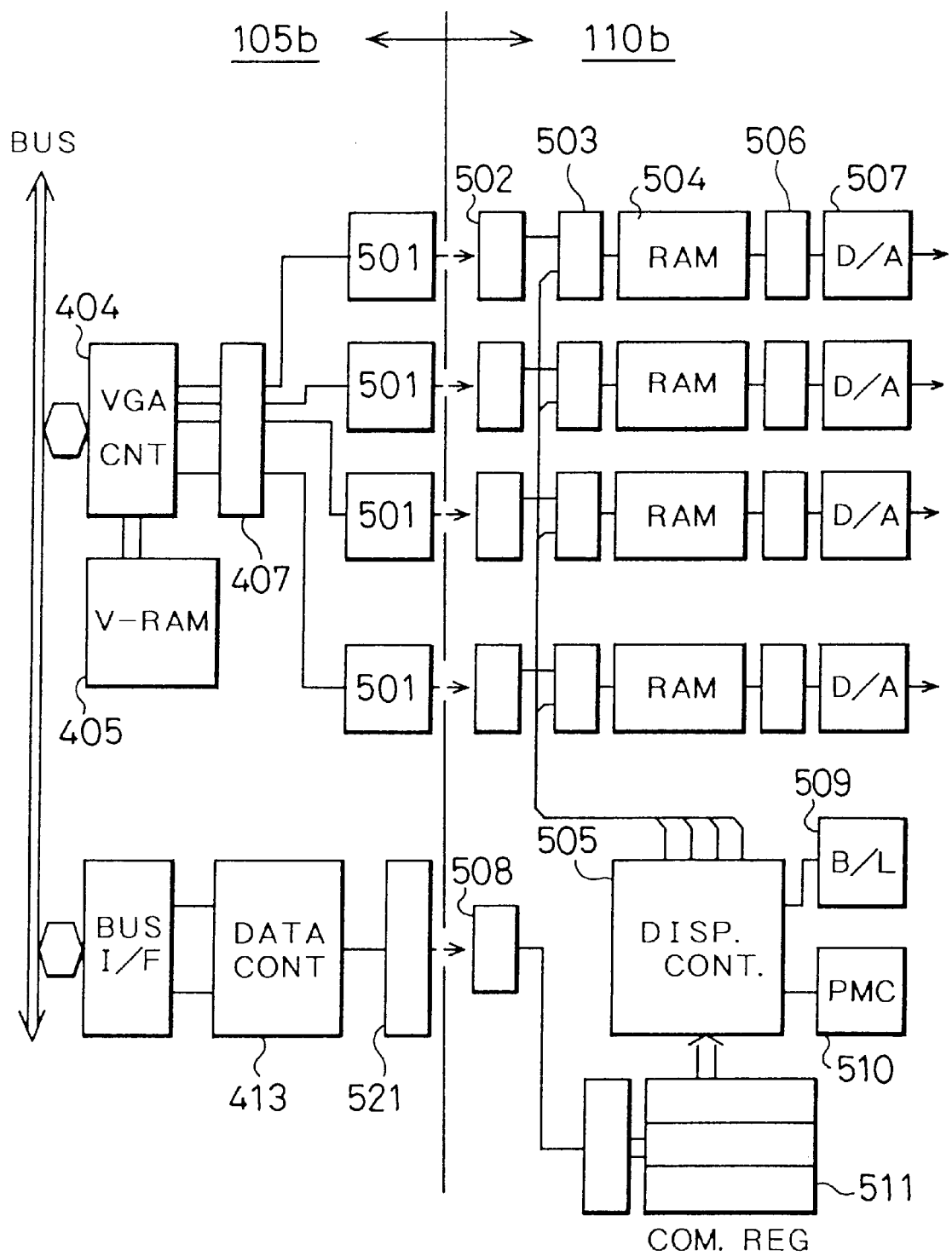
FIG. 14 is a block diagram showing one available structure of an interface circuit used in the body mount-type information display apparatus of the third embodiment.

FIG. 14 is a block diagram illustrating a circuit structure of a modulator unit in the control circuit unit 105*b* and a demodulator unit in the interface unit 110*b* for the transmission of signals with infrared rays. A composite video signal for displaying an image on a CRT 406 includes component video signals RGB, a horizontal synchronizing signal, and a vertical synchronizing signal. The frequency of the VGA composite video signal ranges 25 MHz to 30 MHz, for example. A band width of approximately 30 MHz is required for transmitting these video signals in series (in baseband transmission). In many cases, however, it is difficult to transmit the signals of this band width to the body mount-type information display apparatus having the small electric power. Transmission of clocks of approximately 30 MHz via a cable results in external radiation of large noises. The structure of the third embodiment accordingly expands the video signal to multiple phases along the time axis (that is, successively expands the video signal to a plurality of parallel signals) for transmission.

In the circuit of FIG. 14, a display unit driving circuit 407 of the control circuit unit 105*b* is connected with a plurality of infrared LEDs 501 for transmitting the video signals RGB as multi-phase parallel signals. The control circuit unit 105*b* further includes a data controller 413 and a modulator 521 for transmitting the synchronizing signals.

The interface unit 110*b* includes infrared sensors 502 (receptor elements), selectors 503, frame memories 504, latches 506, and D-A converters 507 corresponding to the respective infrared LEDs 501. Each selector 503 selectively outputs either an input signal from the corresponding infrared sensor 502 or an input signal from a display controller 505. The interface unit 110*b* further includes a command register 511 connected to the display controller 505. The display controller 505 is connected with a back light circuit 509 and a power management circuit 510 in the display unit 103.

VGA controller 404 is connected to a bus in the control circuit unit 105*b* and outputs a video signal having the frequency of approximately 30 MHz to the display unit driving circuit 407. The video signal input into the display unit driving circuit 407 is divided into three color video signals R, G, and B by an internal phase expansion circuit, which is not shown. Each color video signal is then successively subjected to multi-phase expansion to a plurality of signals (hereinafter referred to as parallel video signals). The plurality of parallel video signals are serially transmitted to the plurality of infrared LEDs 501.

The number of the infrared LEDs 501 (that is, the number of multi-phase expansion) depends upon the number of video signal inputs into a liquid crystal panel used for the display unit 103 and the frequency domain which the infrared LEDs 501 can modulate. When a peripheral circuit-built-in-type polysilicon TFT liquid crystal panel is used as the liquid crystal panel 203 of the display unit 103, an image can be displayed on the liquid crystal panel in response to the plurality of expanded parallel video signals. The infrared LEDs allow modulation, for example, in the frequency domain of approximately 1 to 4 MHz. In the restricted frequency domain, the original video signal is expanded to the parallel video signals of the specific number that coincides with the number of inputs into the liquid crystal panel and transmitted. By way of example, when the video signal for driving the liquid crystal panel has 12 phases, the frequency per phase has a signal band of approximately 2.5 MHz (=30/12). Namely the multi-phase parallel video signals can be transmitted in parallel with the twelve infrared LEDs.

The synchronizing signals for synchronizing these multi-phase parallel video signals are transmitted to a timing demodulator 508 via the modulator 521. The timing demodulator 508 receives the vertical synchronizing signal and the horizontal synchronizing signal as well as a command signal superposed on the blanking interval of vertical retrace line (vertical blanking interval). The command signal is stored in the command register 511. In response to this command signal, the display controller 505 outputs a signal for controlling the lightness of the back light circuit 509 and a signal for controlling the power management circuit 510 in the display unit 103.

Each infrared sensor 502 in the connector unit 10*b* receives an infrared ray output from the corresponding infrared LED 501 and reproduces a parallel video signal. The input parallel video signal is then written into the frame memory 504 via the selector 503. The frame memory 504 stores image data that represents a 256-tone image by 8 bits per pixel and per color. The frame memory 504 has a capacity for storing an image part corresponding to each column line (also referred to as the bit line) of the liquid crystal panel. The address of the frame memory 504 is controlled by the display controller 505. A digital output from the frame memory 504 is transmitted via the latch 506 to the D-A converter 507 and converted to an analog signal. Namely the plurality of D-A converters 507 output a plurality of parallel video signals. The plurality of parallel video signals are input into a plurality of video signal input terminals of the liquid crystal panel. A resulting video image is accordingly displayed on the liquid crystal panel of the display unit 103.

The infrared digital transmission technique used here may be a transmission process in conformity with the standard of IrDA (Infrared Data Association) proposed by Hewlett-Packard Company, U.S.A.

FIG. 15 is a block diagram illustrating another available structure of the interface circuit applicable for the body mount-type information display apparatus of the third embodiment. The circuit of FIG. 15 transmits the video signal according to an FM multiple transmission method.

FIG. 15(*a*) illustrates the structure of the modulator unit in the control circuit unit 105*b*. The modulator unit in the control circuit unit 105*b* includes an NTSC encoder 530, a synchronizing signal generator 532, a burst gate 534, three voltage control oscillators (VCOs) 536, a mixing circuit 542, three driver circuits 538, and three infrared LEDs 540 (photo diodes). The NTSC encoder 530 generates one luminance signal Y and two color difference signals (B-Y) and (R-Y) from three video signals of R, G, and B. These three color difference signals are respectively input into the VCOs 536 for FM modulation. In the mixing circuit 542, the second color difference signal (R-Y) is mixed with a vertical synchronizing signal VSYNC output from the burst gate 534. The mixed FM-modulated signal is input into the driver circuit 538, which subsequently drives the infrared LED 540 for emission of an infrared ray. The second color difference signal (R-Y) is accordingly transmitted as the FM-modulated signal superposed on the vertical synchronizing signal VSYNC to the demodulator unit in the interface unit 110. In a similar manner, the luminance signal Y is transmitted as the FM-modulated signal superposed on a horizontal synchronizing signal HSYNC to the demodulator unit in the interface unit 110b. The first color difference signal (B-Y) is transmitted as the FM-modulated signal of itself to the demodulator unit in the interface unit 110b.

FIG. 15(b) illustrates the structure of the demodulator unit in the interface unit 110b. The demodulator unit in the interface unit 110b includes three infrared sensors 550 (photo transistors) functioning as receptor elements, three amplifiers 552, three wave-shaping circuits 554, three FM demodulating circuits 556, a horizontal synchronizing signal separation circuit 558, a matrix conversion circuit 560, and a vertical synchronizing signal separation circuit 562. The FM-modulated signals received by the three infrared sensors 550 are respectively amplified by the amplifiers 552, wave-shaped by the wave-shaping circuits 554, and demodulated by the FM demodulating circuits 556. The horizontal synchronizing signal separation circuit 558 separates the horizontal synchronizing signal HSYNC from the demodulated first signal. The vertical synchronizing signal separation circuit 562 separates the vertical synchronizing signal VSYNC from the third signal amplified by the amplifier 552. The matrix conversion circuit 560 reproduces three color video signals of R, G, and B from the luminance signal Y and the two color difference signals (B-Y) and (R-Y).

As shown in FIG. 15, the circuit according to the FM modulation and demodulation method does not require the frame memories 504 shown in FIG. 14 and has a simpler circuit structure than the circuit of FIG. 14. The circuit of FIG. 15 also advantageously decreases the numbers of the transmitters (infrared LEDs 540 in the example of FIG. 15) and the receptors (infrared sensors 550), compared with the circuit of FIG. 14.

In a typical example, among the three signals, the luminance signal Y has the severest change and the second color difference signal (R-Y) has the gentlest change, whereas the change in first color difference signal (B-Y) is somewhere in between. In the FM modulation method discussed above, it is accordingly possible that the carrier of the luminance signal Y is set to have the highest frequency and that of the second color difference signal (R-Y) is set to have the lowest frequency, whereas the carrier of the first color difference signal (B-Y) is set to have an intermediate frequency. By way of example, the carrier of the luminance signal Y is set to 38 MHz, the carrier of the first color difference signal (B-Y) to 18 MHz, and the carrier of the second color difference signal (R-Y) to 8 MHz, respectively. When the band width is set to be approximately 4 MHz in both directions from each specified frequency, the bands of the three signals do not have any overlaps. This configuration enables three signals to be subjected to multiple frequency division to be transmitted. In the case of transmission of signals after the multiple frequency division, the numbers of the transmitter (infrared LED 540 in the example of FIG. 15) and the receptor (infrared sensor 550) may be reduced respectively to one.

The third embodiment shown in FIGS. 13 through 15 uses the electromagnetic waves for transmission of signals between the control circuit unit and the display unit and omits part of the wiring, thereby improving the workability of manual operations by the operator.

D. Variety of Input Means

A variety of input means described below are applicable for the input into the body mount-type information display apparatuses of the first through the third embodiments discussed above.

FIG. 16 shows a magnetic field-based input means (a magnetic pointing device). In the example of FIG. 16(a), two excitation coils 602 and 604 are mounted on the head strap 102 to be arranged on both sides of the display unit 103. The operator also wears an instruction ring 606 utilizing the magnetism on a finger.

The two excitation coils 602 and 604 respectively produce magnetic fields for positional detection in X and Y directions. These two excitation coils 602 and 604 are alternately and periodically activated to produce the respective magnetic fields. The X and Y directions correspond to the horizontal direction and the vertical direction of the front view of the operator. Namely the X and Y directions respectively correspond to the horizontal direction and the vertical direction of the image displayed on the display unit 103.

FIG. 16(b) conceptually shows partial structure of the instruction ring 606 worn on the finger of the operator. The instruction ring 606 includes a power source 610 (typically a battery), a resistance 611, a magnetic resistance element 612, an amplifier 614, an A-D converter 616, a push switch 618 (mechanical switch), a modulator circuit 620, and an infrared LED 622. In FIG. 16(b), the magnetic field produced by the excitation coil 604 is shown by the broken line. The resistance of the magnetic resistance element 612 is varied with a variation in intensity of the magnetic field passing through the element 612. The end-to-end voltage of the magnetic resistance element 612 is accordingly varied with a variation in intensity of the magnetic field. The voltage is amplified by the amplifier 614 and converted to digital data by the A-D converter 616. The modulator circuit 630 executes on/off control of the infrared LED 622 based on the digital data and enables the infrared LED 622 to generate a modulated infrared ray. The display unit 103 is provided with an infrared sensor (receptor element), which is not shown, whereas the control circuit unit 105 (omitted from the illustration of FIG. 16) has a demodulator circuit. The demodulator circuit demodulates the signal transmitted from the infrared LED 622 and thereby determines the position of the instruction ring 606 in the X direction. The relationship between the modulated signal output from the instruction ring 606 and the position of the instruction ring 606 in the X direction is registered in advance in the control circuit unit 105.

The circuit for the position detection in the Y direction is constructed in the same manner as that shown in FIG. 16(b). The direction of the magnetic resistance element is, however, arranged to be perpendicular to that in the circuit for the X direction. The instruction ring 606 has only one push switch 618.

When the operator slants the finger to incline the instruction ring 606, the magnetic fields passing through the respective magnetic resistance elements 612 varies in intensities and may cause an error in the positional detection. In such a case, correction corresponding to the inclined angle may be made for the variations in resistance of the respective magnetic resistance elements 612 in the X and Y directions, in order to eliminate the effects of the inclination.

After the determination of the position of the instruction ring 606 in both the X direction and the Y direction, a pointer is displayed on the screen. The operator can shift the position of the pointer displayed on the screen by moving the finger, on which the instruction ring 606 is worn.

Like the mouse button, the operator uses the push switch 618 to give an instruction to the computer. While a menu is displayed on the screen of the display unit 103, the operator shifts the pointer of the instruction ring 606 onto a desired option in the menu and presses the push switch 618. An operation corresponding to the selected option is then carried out.

The two-dimensional magnetic field-based input means relatively readily implements a two-dimensional pointing device in the body mount-type information display apparatus. Three sets of the excitation coils and the magnetic resistance elements will implement a three-dimensional pointing device.

The body mount-type information display apparatus with the two-dimensional or three-dimensional pointing device enables the operator to readily select a desired piece of information among the electronic information displayed together with the outside view in an overlapped manner and give an instruction to display an additional piece of information relating to the selected piece of information or carry out a predetermined operation. Especially the input method shown in FIG. 16 does not require the operator to hold the input means with a hand, so that the operator can give an instruction to the computer with both hands usable for another operation (for example, for holding an object). Oral input is another input method which does not require a hand. The input method shown in FIG. 16 can, however, give more accurate instructions, compared with the oral input.

FIG. 17 shows an infrared emission-based input means (an optical pointing device). In the example of FIG. 17(*a*), the display unit 103 is provided with a CCD camera 630, and the operator wears an instruction ring 632 on a finger. The instruction ring 632 includes an infrared LED, a push switch, and a battery.

The CCD camera 630 has a camera lens whose angle of view includes that of a virtual image of a display on the display unit 103. The CCD camera 630 is mounted on the approximate center of the display unit 103 in order to take an image as the eyes of the operator move. The infrared ray emitted from the instruction ring 632 is shot as a spot image by the CCD camera 630. The position of the spot is displayed on the screen of the display unit 103. The operator can accordingly observe both the outside view and the electronic information while the spot representing the position of the instruction ring 630 is displayed upon the electronic information in the display unit 103. By way of example, while an image including a plurality of objects is displayed as the electronic information, the operator can select an object indicated by the spot position of the instruction ring 630 and enable a predetermined operation (for example, display of a detailed specification of the selected object) to be carried out automatically.

When an input menu as shown in FIG. 17(*b*) is displayed as the electronic information, the operator shifts the spot of the instruction ring 606 onto a desired option in the menu and presses the push switch to select the option. A predetermined operation corresponding to the selected option is then carried out.

The remote control-type pointing devices as shown in FIGS. 16 and 17 enable the operator to readily specify the two-dimensional position in the image while observing the electronic information displayed upon the outside view, so as to activate a desired operation. The input means shown in FIGS. 16 and 17 make both hands of the operator free, so that the operator can specify the position in the screen even during another work. The input method shown in FIG. 17 has a simpler structure but implements more accurate input of the two-dimensional position, compared with the input method shown in FIG. 16.

Figure 18A:
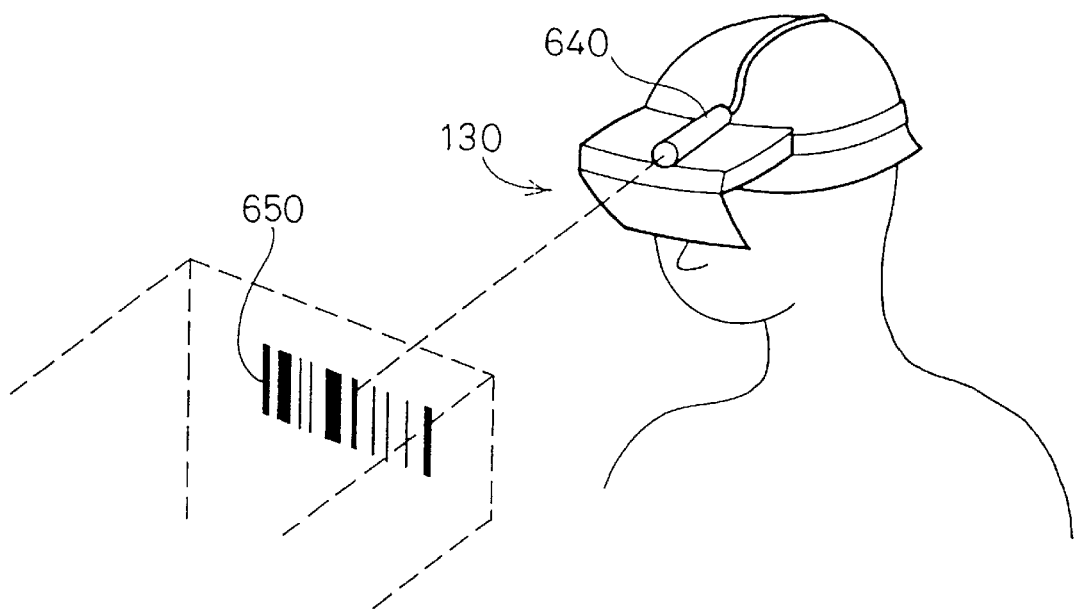
FIGS. 18(a)–18(b) show a CCD camera-based input means.
Figure 18B:
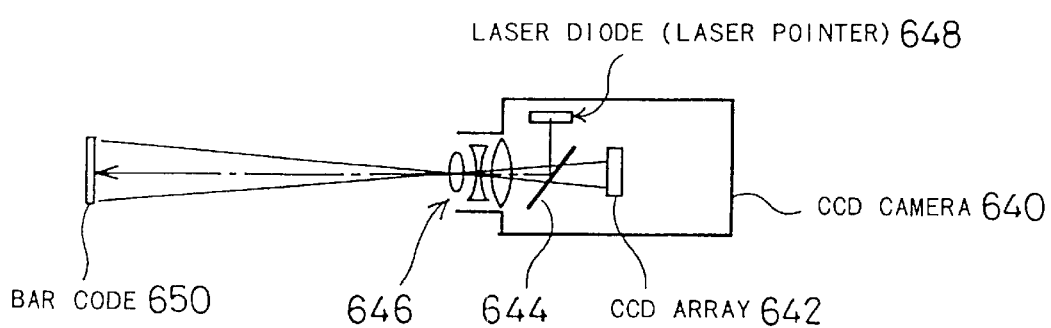

FIG. 18 shows a CCD camera-based input means. As shown in FIG. 18(*a*), CCD camera 640 is used as a bar code reading means for reading a bar code 650. FIG. 18(*b*) conceptually illustrates an internal structure of the CCD camera 640. The CCD camera 640 includes CCD array 642, a half mirror 644, a camera lens system 646, and a laser diode 648. A light beam emitted from the laser diode 648 is reflected from the half mirror 644 and passes through the camera lens 646. The bar code 650 is then irradiated with this transmitted light. The laser diode 648 also has the function of a laser pointer and the operator can visually recognize the position of the light spot. The operator instructs a start of reading the bar code after confirming that the light spot of the laser is placed on the bar code 650. The light beam reflected from the bar code 650 is collected by the camera lens 646, passes through the half mirror 646, and is received by the CCD array 642. The laser diode 648 functioning as the emission element and the CCD array 642 functioning as the image pick-up element are arranged on the optically equivalent optical axes.

As shown in FIG. 18(*a*), the CCD camera 640 is arranged to take an image of the bar code 650 as the eyes of the operator move. When the operator watches the bar code 650 attached to an item and instructs a start of reading, the bar code 650 is read by the CCD camera 640. In the example shown in FIG. 18, the CCD camera 640 starts reading the bar code while the operator observes the bar code to be read. This arrangement enables the operator to selectively and readily read a bar code at an arbitrary position.

The control circuit unit 105 (omitted from the illustration of FIG. 18) decodes the scanned bar code 650 and generates a coded signal. The relationship between the coded signal of the bar code 650 and the item with the bar code 650 attached thereto is stored in a storage unit in the control circuit unit 105 (or a storage unit in the host computer 804). The control circuit unit 105 reads information regarding the item indicated by the bar code 650 and displays the information on the display unit 103. The operator can thus obtain a display of various information regarding the item with the bar code 650 attached thereto only by watching the bar code 650 in the work field. The information of the item includes, for example, the date of production and a lot number. When the item is wrapped, a color image of the item may be displayed. In the field of distribution, this arrangement enables required items to be selected and collected without mistakes. This arrangement also enables items to be correctly stored at specified positions in a warehouse.

Figure 19A:
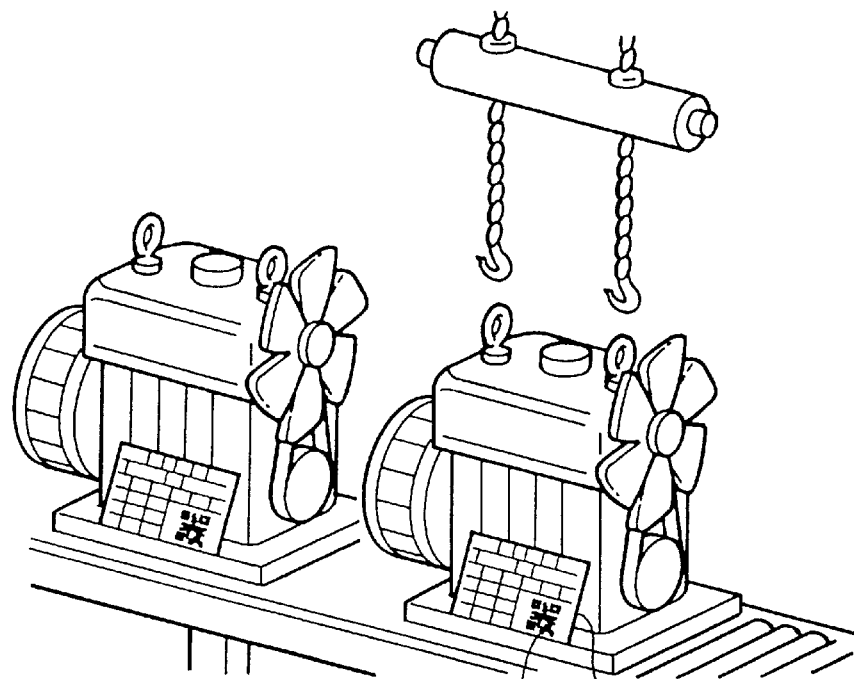
FIGS. 19(a)–19(b) show a work utilizing the CCD camera.
Figure 19B:
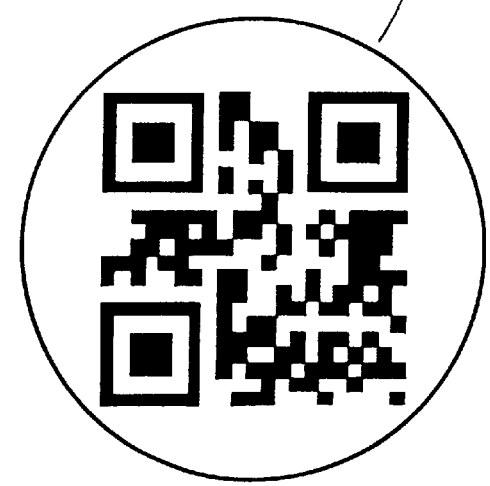

FIG. 19 shows an example of work utilizing the input means with the CCD camera 640 shown in FIG. 18. FIG. 19(*a*) shows a production line in a factory of engines, and FIG. 19(*b*) shows a two-dimensional bar code placed in front of each engine. Like this example, the bar code may be a two-dimensional bar code. The bar code is not necessarily attached to the item but should be related to the item in some way.

In the example of FIG. 19, the operator can obtain a display of information regarding the engine related to the two-dimensional bar code only by watching the bar code and causing the CCD camera 640 to read the bar code.

When the body mount-type information display apparatus has the bar code reading means, the operator can read the bar code with the body mount-type information display apparatus in the field and observe the information related to the bar code simultaneously with the item. This arrangement enables the item to be handled without mistakes.

Figure 20A:
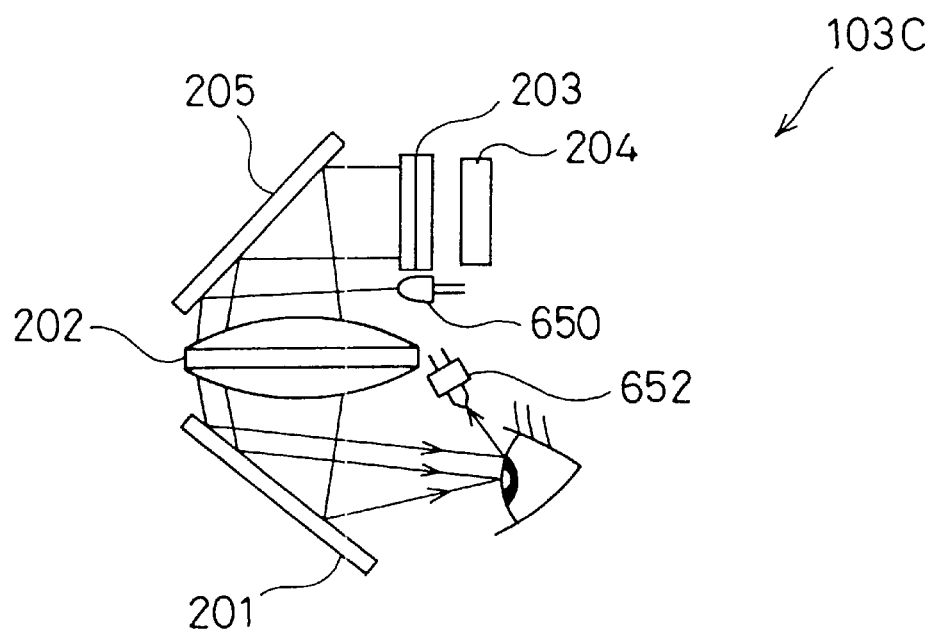
FIGS. 20(a)–20(b) show an on/off control of the display through an eye input.

FIG. 20 shows an on/off control of the display through an eye input. FIG. 20(*a*) shows the structure of a display unit 103*c* for implementing the control through en eye input. The display unit 103*c* has an infrared LED 650 and an infrared sensor 652 in addition to the optical system shown in FIG. 2(*b*). An infrared ray emitted from the infrared LED 650 is reflected by the reflecting mirror 205, passes through the magnifying lens 202, is reflected again by the half mirror 201, and enters the eye of the user. The infrared sensor 652 detects the infrared ray reflected by the cornea of the user.

Figure 20B:
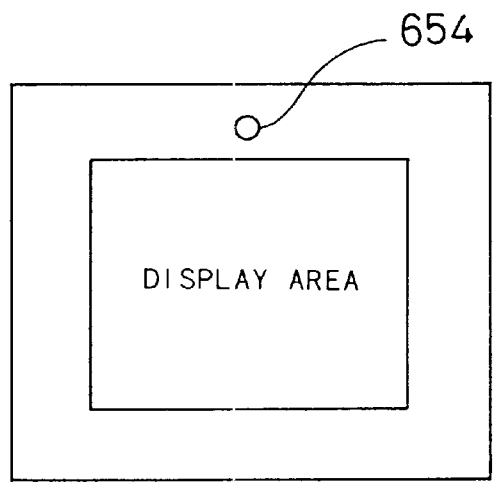

FIG. 20(b) shows a screen displayed on the display unit 103. A position 654 for the on/off control of the display through an eye input is marked in advance above the display area of the liquid crystal panel 203. When the user moves the eye to the position 654, the infrared sensor 652 detects the movement of the eye and switches on/off the display on the liquid crystal panel 203.

The position 654 of the eyes for the on/off control is desirably set to be outside the display area and generally not seen by the operator. This configuration can prevent the operator from mistakenly changing the state of the display. A mark, such as 'Switch of Display', may be used instead of the position 654 of the eyes for the on/off control. In this case, the on/off state of the display is switched when the operator watches the mark.

As discussed above, the display switching means for switching the on/off state of the display on the liquid crystal panel 203 through an eye input effects a control that enables the operator to observe only the outside view or to simultaneously observe the electronic information and the outside view simply through a movement of the eye. This arrangement does not require any manual operation for changing the state of the display, so that the operator can readily change the state of the display even during any manual operation.

INDUSTRIAL APPLICABILITY

The body mount-type information display apparatus of the present invention is applicable to a variety of cases for simultaneously observing electronic information generated by the computer and the outside view, for example, plans and examinations of plants and buildings, industrial measurement and examination, guard duties, and collection and management of industrial and commercial items.

What is claimed is:

1. A body mount-type information display apparatus attachable to a body of a user, comprising:

a computer unit for generating information to be displayed;

first attachment means for attaching said computer unit to a part of the body of the user;

a display unit attachable to the head of the user for displaying the information generated by the computer unit to be observable by the user; and second attachment means for attaching the display unit to the head of the user, wherein the display unit comprises, an image display element for displaying the information generated by the computer, a display switching means for switching an on/off state of an image displayed on the image display element according to movement of the user's eyes, and an optical system for refracting a first light beam representing the image displayed on the image display element to enable the user to observe a magnified virtual image of the displayed image, and for causing the first light beam and a second light beam from an external field of vision to enter the eyes of the user.

2. A body mount-type information display apparatus in accordance with claim 1, wherein the optical system comprises:

a magnifying optical system for refracting the first light beam representing the image displayed on the image display element to enable the user to observe a magnified virtual image of the displayed image; and a see-through optical system for transmitting the second light beam and enabling the transmitted second light beam and the first light beam to enter the eyes of the user.

3. A body mount-type information display apparatus in accordance with claim 2, wherein the magnifying optical system is a single-eye optical system for leading the first light beam to one eye;

the see-through optical system comprises a translucent plane mirror arranged in front of both the eyes of the user; and the display unit further comprises:

switching means arranged to be able to move the magnifying optical system to be positioned in front of either one of the left and right eyes of the user.

4. A body mount-type information display apparatus in accordance with claim 2, wherein the magnifying optical system and the see-through optical system are single-eye optical systems for leading the first light beam and the second light beam to one eye; and the display unit further comprises:

switching means arranged to be able to move the magnifying optical system and the see-through optical system to be positioned in front of either one of the left eye and the right eye of the user.

5. A body mount-type information display apparatus in accordance with claim 1, wherein the optical system comprises a translucent concave mirror arranged in front of the eye of the user.

6. A body mount-type information display apparatus in accordance with claim 1, wherein the computer unit comprises:

a power source;

power management means for regulating power consumption of the power source; and power management switching means for switching a working condition of the power management means depending upon whether or not the computer unit is attached to the first attachment means.

7. A body mount-type information display apparatus in accordance with claim 1, wherein the computer unit comprises:

an interface for connecting the computer unit with peripheral equipment to construct a desktop computer system when the computer unit is not attached to the body of the user, the peripheral equipment including at least one of a keyboard, a first pointing device, a display device, and a printer.

8. A body mount-type information display apparatus in accordance with claim 7, wherein the computer unit further comprises:

a second pointing device that is usable at least when the computer unit is not attached to the body of the user.

9. A body mount-type information display apparatus in accordance with claim 1, wherein the computer unit comprises:

information communications means for communicating with an external host computer to receive a desired piece of information from the host computer.

10. A body mount-type information display apparatus in accordance with claim 9, wherein the piece of information received from the host computer includes image information representing an image displayed on the display unit.

11. A body mount-type information display apparatus in accordance with claim 10, wherein the information communications means supplies positional information to the host computer, the positional information including at least one of a direction, a visual angle, and a distance of an outside object seen from the user, and the information communications means receives from the host computer the image information representing an image processed according to the positional information, thereby effecting to display the image on the display unit in harmony with the object.

12. A body mount-type information display apparatus in accordance with claim 11, wherein the positional information is supplied from a global positioning system.

13. A body mount-type information display apparatus in accordance with claim 10, wherein the information communications means instructs the host computer to change a size of an image displayed on the display unit and receives the image information representing the image of changed size, thereby effecting to display the image on the display unit in harmony with a size of an object in the outside.

14. A body mount-type information display apparatus in accordance with claim 1, wherein the computer unit comprises modulation means for modulating a video signal representing an image to be displayed on the display unit and transmitting the modulated video signal to the display unit; and the display unit comprises demodulation means for receiving and demodulating the modulated video signal.

15. A body mount-type information display apparatus in accordance with claim 1, further comprising:

a magnetic pointing device for specifying a position in an image displayed on the display unit, in response to an intensity of a magnetic field at a position of a magnetic device attached to part of a hand of the user.

16. A body mount-type information display apparatus in accordance with claim 1, further comprising:

an optical pointing device for capturing a light beam output from an emission device attached to part of a hand of the user, thereby specifying a position in an image displayed on the display unit.

17. A body mount-type information display apparatus in accordance with claim 1, further comprising:

a sensor for detecting an object that is not directly observable with naked eyes;

wherein the computer unit displays an image of the object detected by the sensor on the display unit.

18. A body mount-type information display apparatus in accordance with claim 1, further comprising:

bar code reading means disposed close to the display unit for reading a bar code existing in the outside, wherein the computer unit displays an image corresponding to the scanned bar code on the display unit.

19. A body mount-type information display apparatus in accordance with claim 18, further comprising:

confirmation means for, when there are plural pieces of the information in the outside and one piece of information to be read is selected among the plural pieces, confirming the selected piece of information.

20. A body mount-type information display apparatus in accordance with claim 19, wherein the confirmation means comprises irradiation means for irradiating the selected piece of information with a light spot; and the information reading means reads the information after confirming whether or not the selected piece of information is irradiated with the light spot.

21. A body mount-type information display apparatus in accordance with claim 1, further comprising:

information reading means disposed close to the display unit for optically reading information in the outside;

wherein the computer unit displays an image corresponding to the optical information on the display unit.

22. A body mount-type information display apparatus in accordance with claim 21, wherein the information in the outside cannot be directly understood by the user; and the computer unit displays the non-understandable information in a user-understandable form on the display unit.

23. An information display method using a body mount-type information display apparatus, which comprises a computer unit for generating information to be displayed; first attachment means for attaching the computer unit to a part of the body of the user; a display unit attached to the head of the user for displaying the information generated by the computer unit to be observable by the user; and second attachment means for attaching the display unit to the head of the user, wherein the display unit further comprises an image display element for displaying information generated by the computer unit, a display switching means for switching an on/off state of an image displayed on the image display element according to movement of the user's eyes, and an optical system for refracting a first light beam representing an image displayed on the image display element to enable the user to observe a magnified virtual image of the displayed image, and causing the first light beam and a second light beam from an external field of vision to enter the eyes of the user, the method comprising the step of:

displaying an image on the image display element including information in harmony with an object outside of the display unit.

24. An information display method in accordance with claim 23, wherein the image displayed on the display unit includes a menu including options of working fields and a selection key for selecting a desired option from the menu.

25. An information display method in accordance with claim 23, wherein the image displayed on the display unit is processed according to positional information in order to harmonize the image with an object existing in the outside, the positional information including at least one of a direction, a visual angle, and a distance of the object seen from the user.

26. An information display method in accordance with claim 23, wherein a size of the image displayed on the display unit is varied to be harmonized with a size of an object in the outside.

27. An information display method in accordance with claim 24, the method further comprising the steps of:

optically reading information in the outside by information reading means disposed close to the display unit; and displaying an image corresponding to the input optical information on the display unit.

28. An information display method in accordance with claim 27, wherein the information in the outside is not directly understandable by the user; and the non-understandable information is displayed in a user-understandable form on the display unit.

29. An information display method in accordance with claim 27, the method further comprising the step of:

when there are plural pieces of the information in the outside and one piece of information to be read is selected among the plural pieces, confirming the selected piece of information.

30. An information display method in accordance with claim 29, wherein the confirmation step comprises a step of irradiating the selected piece of information with a light spot; and the information reading step comprises the step of reading the information after confirming whether or not the selected piece of information is irradiated with the light spot.

* * * * *